US010579868B2

(12) United States Patent
Lelore et al.

(10) Patent No.: US 10,579,868 B2
(45) Date of Patent: Mar. 3, 2020

(54) SYSTEM AND METHOD FOR RECOGNITION OF OBJECTS FROM INK ELEMENTS

(71) Applicant: MyScript, Nantes (FR)

(72) Inventors: Thibault Lelore, Nantes (FR); Udit Roy, Nantes (FR)

(73) Assignee: MYSCRIPT, Nantes (FR)

( * ) Notice: Subject to any disclaimer, the term of this patent is extended or adjusted under 35 U.S.C. 154(b) by 1 day.

(21) Appl. No.: 15/700,781

(22) Filed: Sep. 11, 2017

(65) Prior Publication Data
US 2018/0285638 A1 Oct. 4, 2018

(30) Foreign Application Priority Data
Mar. 30, 2017 (EP) .................... 17290046

(51) Int. Cl.
G06K 9/00 (2006.01)
G06K 9/22 (2006.01)
G06K 9/48 (2006.01)
G06K 9/34 (2006.01)
G06K 9/78 (2006.01)

(52) U.S. Cl.
CPC ......... *G06K 9/00416* (2013.01); *G06K 9/222* (2013.01); *G06K 9/481* (2013.01); *G06K 9/344* (2013.01); *G06K 9/78* (2013.01); *G06K 2209/01* (2013.01)

(58) Field of Classification Search
CPC ........... G06K 2209/01; G06K 9/00416; G06K 9/222; G06K 9/344; G06K 9/481; G06K 9/78
See application file for complete search history.

(56) References Cited

U.S. PATENT DOCUMENTS 4,034,344 A 7/1977 Saraga et al.
5,113,453 A 5/1992 Simon
(Continued)

OTHER PUBLICATIONS

Liu, L., et al., "A Kai style contour beautification method for Chinese handwriting characters", Systems Man and Cybernetics (SMC), 2010 IEEE International Conference on, IEEE Piscataway, NJ, USA,Oct. 10, 2010 (Oct. 10, 2010), pp. 3644-3649, XP031805830, DOI: 10.1109/ICSMC.2010.5641880, ISBN: 978-1-4244-6586-6, p. 3645; figure 3.

(Continued)

*Primary Examiner* — Bhavesh M Mehta
*Assistant Examiner* — Ian L Lemieux
(74) *Attorney, Agent, or Firm* — McDermott Will & Emery LLP

(57) ABSTRACT

A system for recognition of objects from ink elements on a computing device is provided. The computing device comprises a processor, a memory and at least one non-transitory computer readable medium for recognizing content under control of the processor. The at least one non-transitory computer readable medium is configured to determine a perimeter of an ink element stored in a memory of the computing device, determine a plurality of pen units for the ink element based on the determined ink element perimeter, determine at least one stroke representing a path through two or more of the pen units, and cause recognition of one or more objects represented by the ink element using the determined at least one stroke.

24 Claims, 25 Drawing Sheets

(56) References Cited

U.S. PATENT DOCUMENTS

| | | | |
|---|---|---|---|
| 5,146,996 A | 9/1992 | Gainer | |
| 5,224,179 A | 6/1993 | Denker | |
| 5,515,455 A | 5/1996 | Govindaraju | |
| 5,991,441 A * | 11/1999 | Jourjine | G06K 9/00416 382/187 |
| 6,064,767 A * | 5/2000 | Muir | G06K 9/6821 382/177 |
| 6,154,565 A | 11/2000 | Johnson | |
| 6,173,075 B1 * | 1/2001 | Collins | G06K 9/00476 382/164 |
| 6,377,710 B1 | 4/2002 | Saund | |
| 2003/0086611 A1 * | 5/2003 | Loudon | G06K 9/342 382/186 |
| 2004/0028274 A1 * | 2/2004 | Kawakami | G06K 9/222 382/187 |
| 2007/0065003 A1 | 3/2007 | Kellerman | |
| 2011/0175916 A1 * | 7/2011 | Noris | G06K 9/00416 345/441 |
| 2011/0248995 A1 * | 10/2011 | Vaughan | G06K 9/44 345/420 |
| 2014/0253558 A1 * | 9/2014 | Zhan | G06K 9/00416 345/441 |
| 2014/0355884 A1 * | 12/2014 | Tran | G06K 9/18 382/188 |
| 2015/0261430 A1 * | 9/2015 | Hagiwara | G06F 3/04883 715/255 |
| 2015/0339525 A1 * | 11/2015 | Marcelli | G06K 9/00416 382/161 |
| 2017/0236021 A1 * | 8/2017 | Petkov | G06F 3/03545 345/179 |

OTHER PUBLICATIONS

Lam, J H M, et al., A skeletonization technique based on dealunay triangulation and piecewise bezier interpolation, 2007 6th International Conference on Information, Communications & Signal Processing; Singapore; Dec. 10-13, 2007, IEEE, Piscataway, NJ, USA, Dec. 10, 2007 (2007-12-100, pp. 1-5, XP031229424, ISBN: 978-1-4244-0982-2, Section IV; Figure 9.

Tan, J., et al., "A novel approach for stroke extraction of off-line Chinese Handwritten Characters Based on Optimum Paths", Frontiers in Handwriting Recognition (ICFHR), 2012 International Conference on IEEE, Sep. 18, 2012 (Sep. 18, 2012), pp. 789-790, XP032322908, DOI: 10.1109/ICFHR.2012.165, ISBN: 978-1-4673-2262-1, Section 2, Figure 1.

International Search Report and Written Opinion for PCT/EP2018/058057, dated Jun. 6, 2018, 9 pages.

* cited by examiner

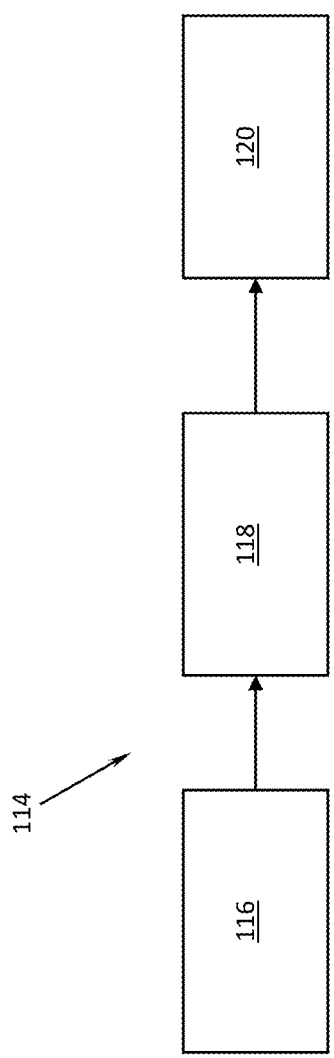

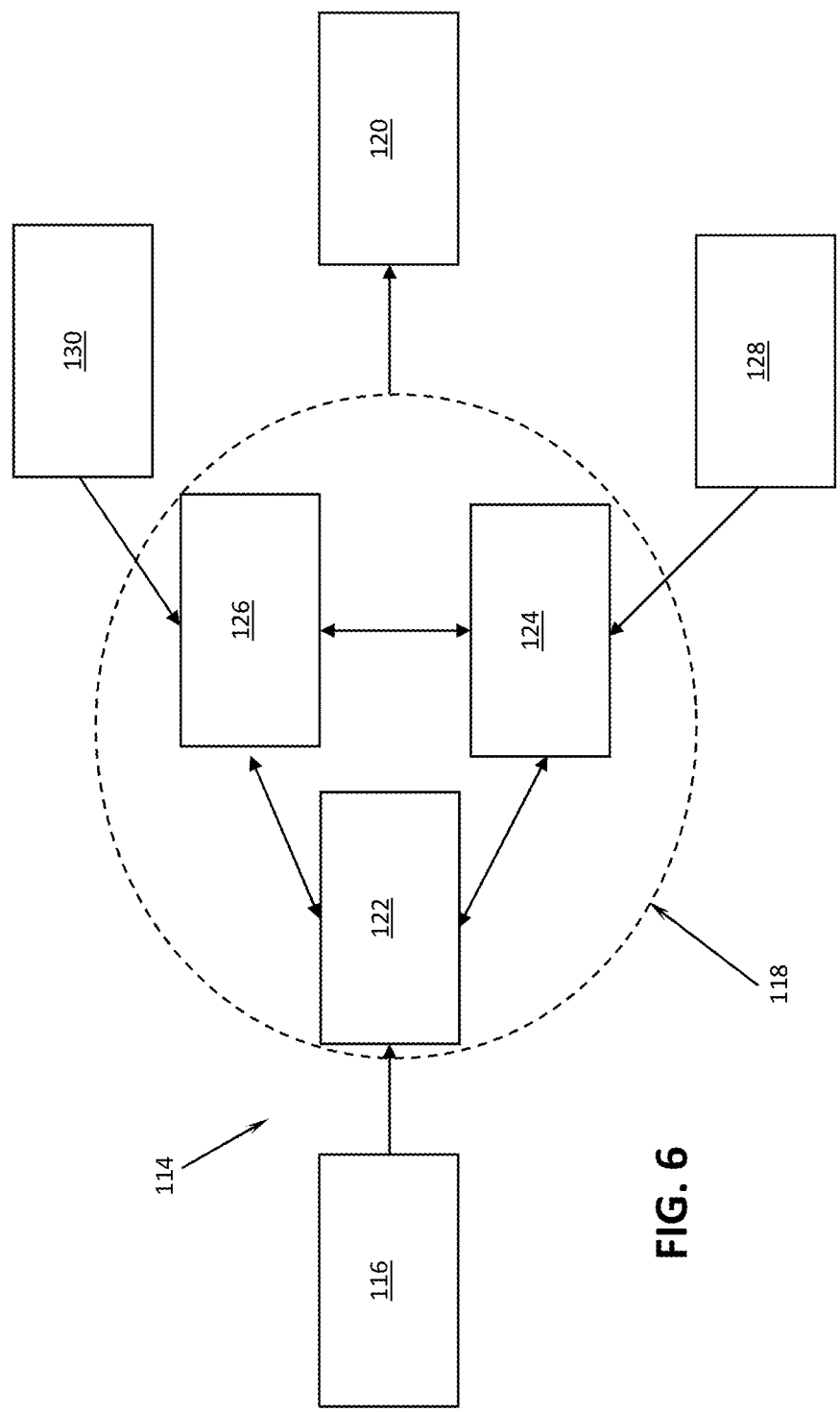

SYSTEM AND METHOD FOR RECOGNITION OF OBJECTS FROM INK ELEMENTS

CROSS-REFERENCE TO RELATED APPLICATIONS

This application claims the benefit of European Patent Application No. 17290046.6, filed Mar. 30, 2017, which is expressly incorporated herein by reference and made a part hereof.

TECHNICAL FIELD

The present description relates generally to the field of computer input recognition systems and methods using computing device interfaces. The present description relates more specifically to systems and methods for recognizing content from images of ink and rendered digital or typeset ink.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. For the input of content, such as text, such devices provide for input on screen through handwriting which involves users entering 'strokes' forming characters and the like, or through typing which involves users 'striking' keys of a displayed or graphical (virtual) keyboard, or through "stroke-like" typing which involves users interacting with the keys of the virtual keyboard with continuous strokes, such as provided by SWYPE®, SWIFTKEY® and TOUCHPAL® keyboards, for example.

Text content of typing input via a virtual (soft) keyboard, for example, is conventionally recognized using a keyboard decoder of the device. Text and non-text content of handwriting input via user interaction with the touch sensitive surface, for example, is conventionally recognized using a handwriting recognizer of the device.

Some devices also have imaging devices, such as in-built cameras, that can be used to image or scan content from non-digital, e.g., printed, or other digital forms, for capture. This captured content may be displayed on the capturing device, such as a smartphone, or communicated with another device, such as a scanner communicating with a connected personal computer (PC), for example.

Typed or fontified text content of imaged input via the camera of the device or scanner, for example, is conventionally recognized using optical character recognition (OCR) so that the imaged text can be converted into editable and searchable digital content. OCR typically involves image processing techniques for resolving text characters from the image. These techniques typically involve analysis of the pixels of the digitized image in 'monochromatic', grayscale or color domains to extract pixels which can be considered to represent the characters from pixels that can be considered to not represent the characters. This process is typically termed "thinning" or "skeletonization" and extracts the 'skeleton' of the imaged characters so as to provide a compact and non-redundant representation of the characters.

A number of conventional skeletonization methods have been developed. The simplest of these methods involve (morphological) thinning of foreground pixels in the image in iterative, single-pass or parallel processing fashion. This simple method is generally performed by removing foreground pixels while thinning the objects. Gradient-based methods involve computing gradients which are highest at boundary pixels of objects and lowest at the skeleton pixels. These gradients can be calculated using distance transforms on the binary or grayscale image intensities. Contour-based methods, such as medial axis transform, techniques with Delaunay triangulation and Voronoi diagrams, use the perimeter of the object to deduce the skeleton. Principal component analysis (PCA) methods have also been explored in which the skeleton is approximated as a set of parametric curves, like Bezier or B-splines, and fitted to the image data.

These conventional OCR skeletonization methods are variously sensitive to noise in the captured or scanned images which results in inaccurate character recognition. This is because poor imaging of the characters introduces spurious artefacts in the image which leads to skeletons being deduced with branches, segments, etc., which are not part of the intended character.

In comparison to typed or printed content, handwritten text content of imaged input, so-called off-line handwriting recognition, is conventionally recognized using intelligent character recognition (ICR) or intelligent word recognition (IWR). ICR systems recognize content from images of characters handwritten in a structured manner. This structure includes characters which are isolated, e.g., non-cursive, and substantially evenly-spaced. ICR has been successful in enterprise form applications in which users handwrite information in fields or boxes designated for individual characters, such as letters, numbers and symbols. IWR systems on the other hand recognize content from images of characters handwritten in an unstructured or free-form manner, e.g., cursive. This is achieved by performing word-based recognition, rather than character-based recognition as in ICR.

Like OCR, ICR and IWR conventionally involve image processing techniques for resolving text characters from the image, including skeletonization. Also like OCR, the accuracy of the recognition using either ICR or IWR depends on the quality of the imaged characters. This is exacerbated for handwriting however as handwriting includes a wide range of natural variation, many differing styles and may not adhere to expected standards. As such, the technique of thinning pixels in images of handwritten content may introduce unwanted trajectories in the handwriting strokes, such as branches, segments, tails, "neckings".

A number of techniques have been investigated for dealing with such issues in handwriting image recognition. For example, U.S. Pat. No. 4,034,344 describes applying compound operators in cycles for thinning handwritten characters, U.S. Pat. No. 5,146,996 describes a process which detects pre-defined geometrical features in the thinned handwritten characters, U.S. Pat. No. 5,224,179 describes thinning using a template or mask, U.S. Pat. No. 5,515,455 describes thinning cursively handwritten words by using temporal information, and U.S. Pat. No. 6,377,710 describes using a contour based method for handwriting.

Other techniques have been developed for recognizing imaged handwriting apart from skeletonization. For example, U.S. Pat. No. 5,113,453 describes a process which attempts to find primitive shapes in imaged handwritten text, U.S. Pat. No. 6,154,565 describes a process using code division multiple access (CDMA) techniques to differentiate handwriting from background pixels, and US Patent Application Publication No. 2007/0065003 describes using classification techniques to distinguish handwritten and printed text.

SUMMARY

The examples of the present disclosure that are described herein below provide systems and methods for recognition of objects from ink elements on computing devices. Each computing device is connected to an input interface and has a processor, a memory and at least one non-transitory computer readable medium for recognizing content under control of the processor.

In some examples of the present disclosure, a system is provided in which the at least one non-transitory computer readable medium is configured to determine a perimeter of an ink element stored in a memory of the computing device, determine a plurality of pen units for the ink element based on the determined ink element perimeter, determine at least one stroke representing a path through two or more of the pen units, and cause recognition of one or more objects represented by the ink element using the determined at least one stroke.

The at least one non-transitory computer readable medium may be configured to determine the plurality of pen units based on a first characteristic of the pen units related to at least one dimension value of the pen units and a second characteristic of the pen units related to positions of the pen units relative to the ink element.

The at least one non-transitory computer readable medium may be configured to determine the plurality of pen units to best fit the ink element based on iteratively determining values of the first and second characteristics of the pen units.

The at least one non-transitory computer readable medium may be configured to determine at least one contour of the ink element which represents the determined ink element perimeter in accordance with the at least one dimension value of the pen units. The plurality of pen units may be positioned relative to the at least one contour.

The at least one non-transitory computer readable medium may be configured to determine the at least one stroke by defining one or more stroke sections based on at least one dimensional feature of the pen units.

The at least one non-transitory computer readable medium may be configured to define the one or more stroke sections by combining one or more first stroke sections determined based on a first threshold of separation of the pen units with one or more second stroke sections determined based on geometrical relationships of at least the one or more first stroke sections and a second threshold of separation of the pen units.

The at least one non-transitory computer readable medium may be configured to determine the geometrical relationships based on vectors related to at least the one or more first stroke sections.

The ink elements may be stored in the memory as image data representing the ink elements as captured by an image capture device.

In some examples of the present disclosure, a method is provided including the steps of determining a perimeter of an ink element stored in a memory of the computing device, determining a plurality of pen units for the ink element based on the determined ink element perimeter, determining at least one stroke representing a path through two or more of the pen units, and causing recognition of one or more objects represented by the ink element using the determined at least one stroke.

The method may include determining the plurality of pen units based on a first characteristic of the pen units related to at least one dimension value of the pen units and a second characteristic of the pen units related to positions of the pen units relative to the ink element.

The method may include determining the plurality of pen units to best fit the ink element based on iteratively determining values of the first and second characteristics of the pen units.

The method may include determining at least one contour of the ink element which represents the determined ink element perimeter in accordance with the at least one dimension value of the pen units. The plurality of pen units may be positioned relative to the at least one contour.

The method may include determining the at least one stroke by defining one or more stroke sections based on at least one dimensional feature of the pen units.

The method may include defining the one or more stroke sections by combining one or more first stroke sections determined based on a first threshold of separation of the pen units with one or more second stroke sections determined based on geometrical relationships of at least the one or more first stroke sections and a second threshold of separation of the pen units.

The method may include determining the geometrical relationships based on vectors related to at least the one or more first stroke sections.

The ink elements may be stored in the memory as image data representing the ink elements as captured by an image capture device.

In some examples of the present disclosure, a non-transitory computer readable medium having a computer readable program code embodied therein is provided. The computer readable program code may be adapted to be executed to implement a method including the steps of determining a perimeter of an ink element stored in a memory of the computing device, determining a plurality of pen units for the ink element based on the determined ink element perimeter, determining at least one stroke representing a path through two or more of the pen units, and causing recognition of one or more objects represented by the ink element using the determined at least one stroke.

The method may include determining the plurality of pen units based on a first characteristic of the pen units related to at least one dimension value of the pen units and a second characteristic of the pen units related to positions of the pen units relative to the ink element.

The method may include determining the plurality of pen units to best fit the ink element based on iteratively determining values of the first and second characteristics of the pen units.

The method may include determining at least one contour of the ink element which represents the determined ink element perimeter in accordance with the at least one dimension value of the pen units. The plurality of pen units may be positioned relative to the at least one contour.

The method may include determining the at least one stroke by defining one or more stroke sections based on at least one dimensional feature of the pen units.

The method may include defining the one or more stroke sections by combining one or more first stroke sections determined based on a first threshold of separation of the pen units with one or more second stroke sections determined based on geometrical relationships of at least the one or more first stroke sections and a second threshold of separation of the pen units.

The method may include determining the geometrical relationships based on vectors related to at least the one or more first stroke sections.

The ink elements may be stored in the memory as image data representing the ink elements as captured by an image capture device.

BRIEF DESCRIPTION OF THE DRAWINGS

The present system and method will be more fully understood from the following detailed description of the examples thereof, taken together with the drawings. In the drawings like reference numerals depict like elements. In the drawings:

FIG. 5 shows a block diagram of a system for input recognition in accordance with an example of the present system and method;

FIG. 6 shows a block diagram illustrating detail of the input recognition system of FIG. 5 in accordance with an example of the present system and method;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The systems and methods described herein may recognize users' natural writing and drawing styles input to a physical surface as physical ink and imaged by a computing device or input to the computing device as 'digital ink' or 'electronic ink' via an input interface, such as a touch sensitive screen, connected to, or of, the computing device or via an input device, such as a digital pen or mouse, connected to the computing device or via a physical or virtual surface monitored by a position detection system. The systems and methods described herein may also recognize 'typeset ink' (e.g., fontified text) printed on a physical surface and imaged by a computing device or displayed/rendered on an input interface of the computing device.

The use of the term 'text' in the present description is understood as encompassing all alphanumeric characters, and strings thereof, in any written language and common place non-alphanumeric characters, e.g., symbols, used in written text. Further, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The terms hand-drawing and handwriting may be used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Reference to and discussion of directional features such as up, down, above, below, lowest, highest, horizontal, vertical, etc., and dimensional features such as height, width, etc. may be made with respect to the Cartesian coordinate system as applied to the medium or surface having or displaying the input to be recognized.

Figure 1:
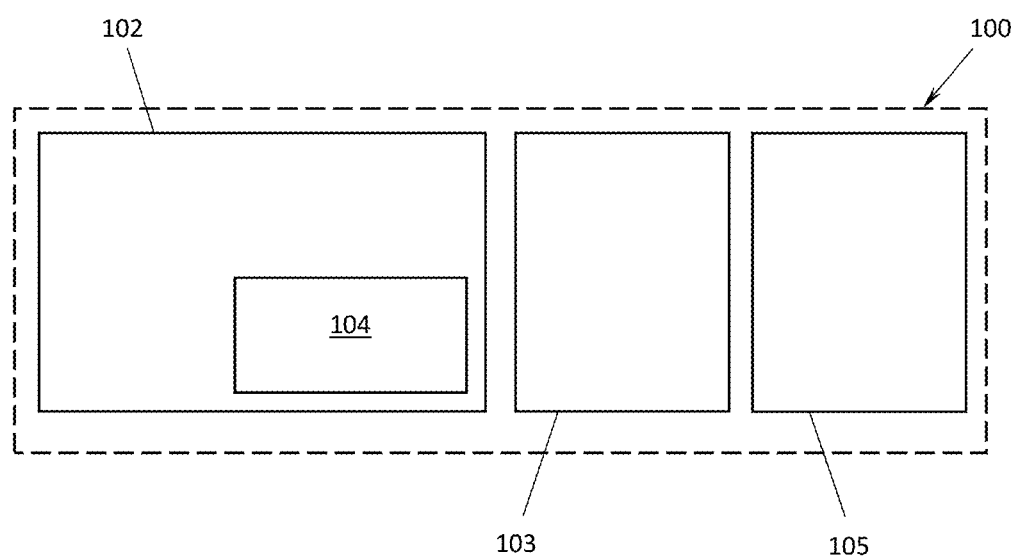
FIG. 1 shows a block diagram of a computing device in accordance with an example of the present system and method.

FIG. 1 shows a block diagram of an example computing or digital device 100. The computing device may be a computer desktop, laptop computer, tablet computer, hybrid computers (2-in-1s), e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The illustrated example of the computing device 100 has at least one display 102 for outputting data from the computing device such as images, text, and video, and at least one image capture device or element 103 for capturing images. The display 102 may use LCD, plasma, LED, iOLED, CRT, or any other appropriate technology that is or is not touch sensitive as known to those of ordinary skill in the art. Instead of, or additional to, an on-board display, the computing device 100 may have a projected display capability or is able to operate with a projected display, such that the input interface is a virtual surface. Further, the display itself may be separate from and connected to the computing device. The image capture device 103 may be a camera such as commonly included in computers, smartphones and like devices, or may be a scanning head such as commonly included in scanners, multifunction printers and like devices.

At least some of the display 102 may be co-located with at least one input interface 104. The input interface 104 may be a surface employing technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input interface 104 may be bounded by a permanent or video-generated border that clearly identifies its boundaries.

The computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

Figure 2:
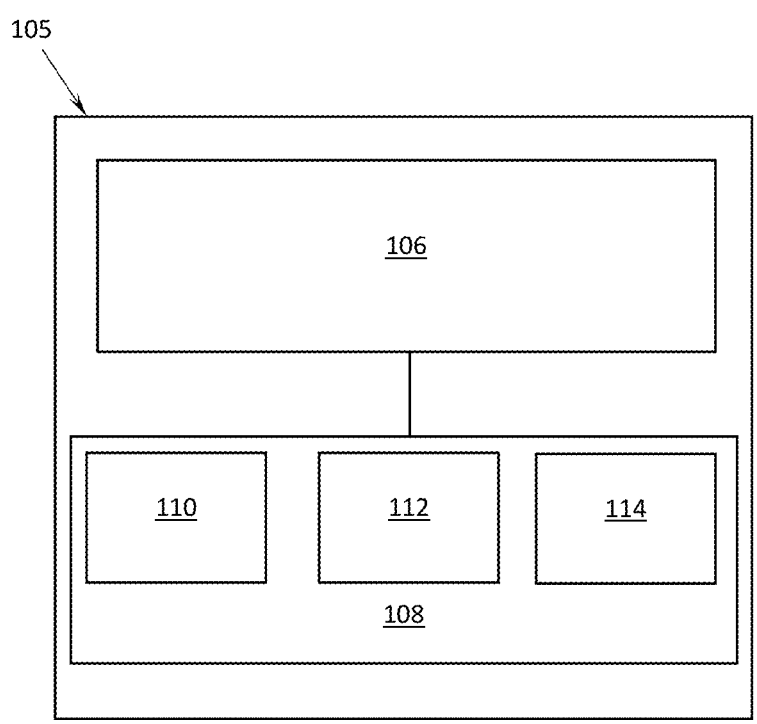
FIG. 2 shows a block diagram of example operating circuitry of the computing device.

The computing device 100 has operating circuitry 105. FIG. 2 shows a block diagram of an example of the operating circuitry 105. In this example, the operating circuitry 105 includes a processor 106, which is a hardware device for executing software, particularly software stored in a memory 108. The processor 106 is configured to operate the hardware, including the display 102 and image capture device 103, and software of the device 100. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

In one example, the software in the memory 108 includes an operating system 110, an input management system 112 in the form of a non-transitory computer readable medium having a computer readable program code embodied therein and an input recognition system 114, which may each include one or more separate computer programs. Each of these has an ordered listing of executable instructions for implementing logical functions. The operating system 110 controls the execution of the input management system 112 and the input recognition system 114, or may incorporate the functions of these systems. The operating system 110 may be any proprietary operating system or a commercially or freely available operating system, such as WEBOS, WINDOWS®, MAC and IPHONE OS®, LINUX, and ANDROID. It is understood that other operating systems may also be utilized. Alternatively, the input management system 112 and input recognition system 114 of the present system and method may be provided without use of an operating system.

The input management system 112 includes one or more processing elements related to detection, management and treatment of user input, including image input. The software may also include one or more applications related to input image recognition, different functions, or both. Some examples of other applications include a text editor, telephone dialer, contacts directory, instant messaging facility, computer-aided design (CAD) program, email program, word processing program, web browser, and image processing. The input management system 112, and the applications, include program(s) provided with the computing device 100 upon manufacture and may further include programs uploaded or downloaded into the computing device 100 after manufacture.

The input management system 112 of the present system and method manages recognition of input to the computing device 100 by the input recognition system 112. The input recognition system 114 and any of its components, with support and compliance capabilities, may be a source program, executable program (object code), script, application, or any other entity having a set of instructions to be performed. When a source program, the program needs to be translated via a compiler, assembler, interpreter, or the like, which may or may not be included within the memory 108, so as to operate properly in connection with the operating system 110.

Furthermore, the input recognition system 114 with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, Python, C# and Ada; or (c) functional programming languages for example but not limited to Hope, Rex, Common Lisp, Scheme, Clojure, Racket, Erlang, OCaml, Haskell, Prolog, and F#.

Alternatively, the input recognition system 114 may be a method or system for communication with an input recognition system remote from the device, such as server or cloud-based system, but is remotely accessible by the computing device 100 through communications links using the afore-mentioned communications I/O devices of the computing device 100. Further, the input management system 112 and the input recognition system 114 may operate together or be combined as a single system. Further still, the input management system 112 and/or the input recognition system 114 may be integrated within the operating system 110.

In one example, the input for recognition includes images of content captured, for example, with the image capture device 103. In another example, the input includes images of content loaded to the memory 108 of the device 100 from an external source, for example, as an image file, document file, etc. In another example, the input includes digital ink rendered from handwritten input to the input interface 104 of the computing device 100 (described in detail later), or other device and loaded to the memory 108. These examples of input methods and input types are not exhaustive and other methods and types are possible with respect to the input for recognition in accordance with the present system and method. This recognition is now described with reference to an example in which the image capture device of the digital device is used for image input.

Figure 3:
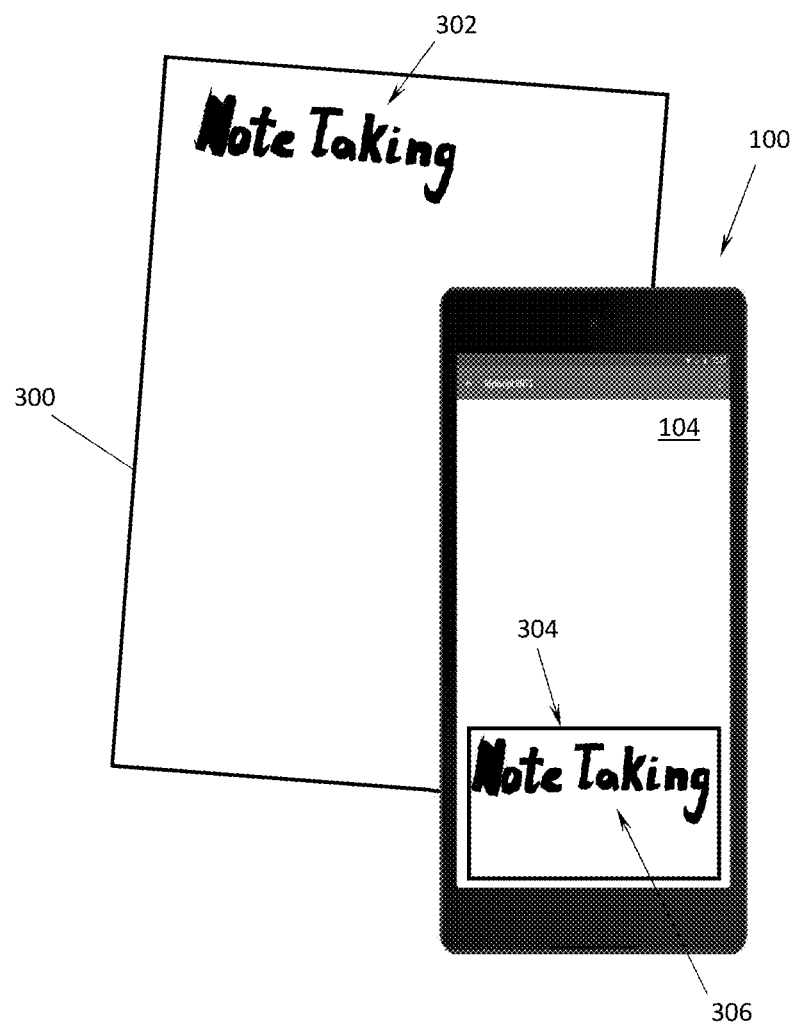
FIG. 3 shows a schematic view of an example physical surface having handwriting thereon and an image of the handwriting rendered as digital ink on a display of the computing device in accordance with an example of the present system and method.

FIG. 3 shows a surface 300 with handwritten content 302 thereon. The surface 100 may be a page or sheet of a paper document, for example. The handwritten content 302 is, for example, handwritten on the surface 100 in multiple strokes as text forming the words "Note Taking". The content 302 could also be printed on the surface 100, for example in a handwriting stylized font. In another example of the present system and method, the content may be printed on the surface as fontified or typeset ink text, or a mixture of typed/printed and handwritten ink may be present on the surface, e.g., such as handwritten annotations on a printed document.

FIG. 3 further shows the computing device 100 on which an input area 304 is displayed on the display 102 by the input management system 112. The input area 304 is a dedicated area or zone of the input interface 104 of the display 102 of the computing device 100 for at least the display of input. Alternatively, or additionally, the input area may be configured over substantially the entire input interface 104 or more than one discrete input area may be provided. The dimensions and functionality of the input area may be provided in correspondence with, and responsive to, the dimensions and orientation of the display area of the display 102 in a well-known manner.

Figure 4:
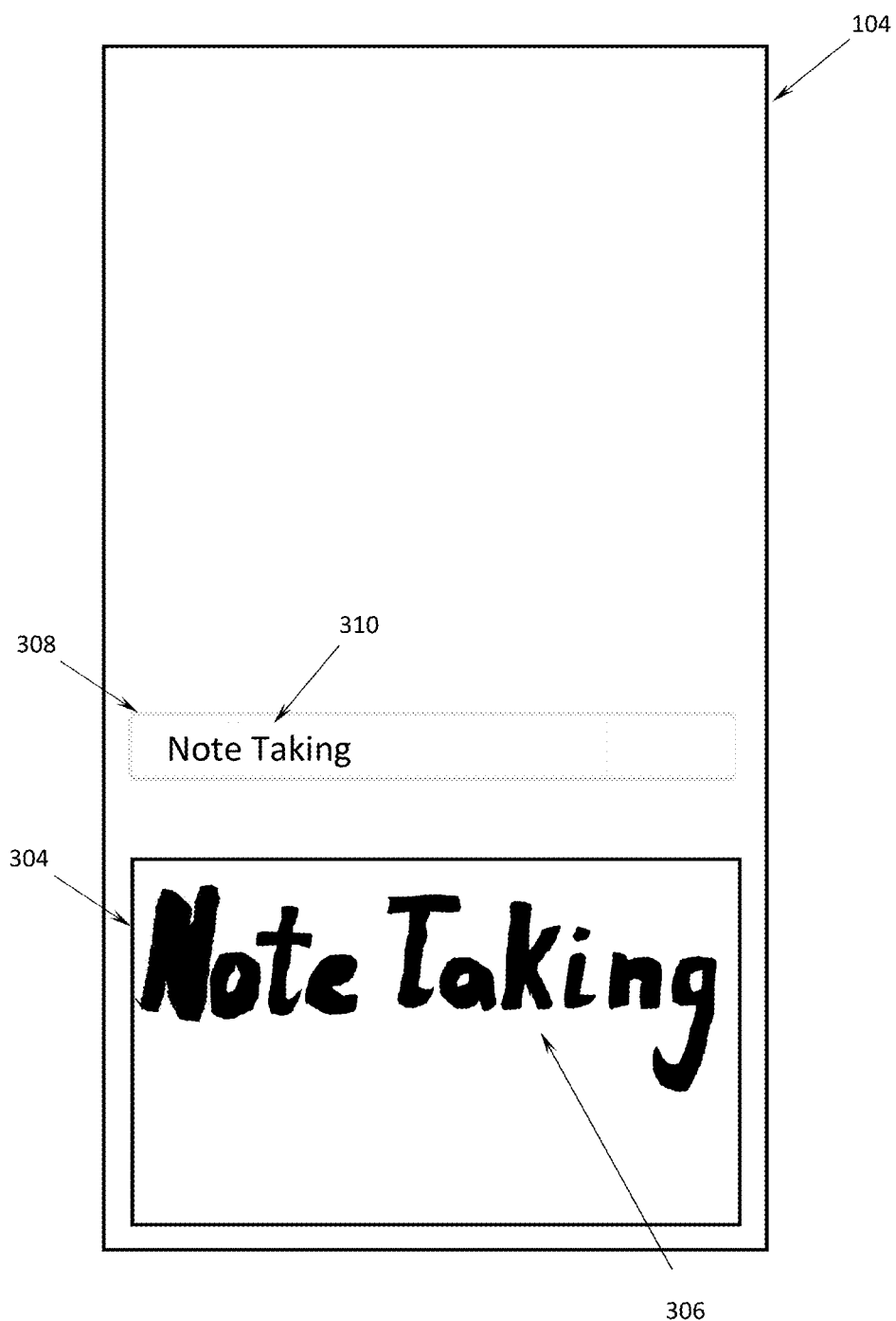
FIG. 4 shows a schematic view of the display with the digital ink displayed thereon in isolation.

In FIG. 3, an image 306 of the handwritten content 302 as captured by the image capture device 103 and stored as image data in the memory 108 is displayed in the input area 304 based on the image data, for example. FIG. 4 shows the input interface 104 in isolation with the input area 304 having the content image or digital ink 306 rendered therein. The input area or panel 304 may be displayed upon the receipt of certain user actions, such as the launching of an application on the computing device 100, interaction with components of that application such as a menu, for example, for the input of content, or when an image is captured by the image capture device 103. However, the present system and method is not restricted to such a mechanism, and the input panel 304 may be provided for the receipt of user input whenever and at any time the interface surface 104 is active, e.g., able to accept user interaction. This is particularly the case where the input panel corresponds substantially to the entire interface surface, such that user interaction with the interface surface represents interaction with the input panel.

In the present system and method, the input management system 112 causes display of the input content either directly or via communication of the input to the active application and/or operating system 110, for example, in a manner similar to that conventionally employed by operating systems and components and applications thereof. That is, the content input to the computing device 100 by imaging using the image capture device 103 is interpreted by an image processor for storage as image data in the memory and display of the image on the display.

The input area 304 may also be configured by the input management system 112 to receive input of content and/or control gestures by users through interaction with the input interface 104 of the computing device 100. That is, the input area 304 may be configured to receive user input of handwritten strokes and 'touch' gestures using a finger or some instrument such as a pen or stylus suitable for use with the input interface as single-point or single-position gestures or interactions, such as tap, short and long press, multi-point or multi-position gestures or interactions, such as double tap, and stroke gestures, such as swipe.

The user may also input handwritten strokes by making a gesture above the input interface 104 if technology that senses or images motion in the vicinity of the input interface 104 is being used, or with a peripheral device of the computing device 100, such as a mouse or joystick, or with a projected interface, e.g., image processing of a passive plane surface to determine the stroke and gesture signals. Regardless of the interaction type, the interactions are generally detected by the processor 106 and information representing the interactions is communicated to the input management system 112.

Further, the input area 304 may also be configured by the input management system 112 to display a soft or virtual keyboard for the input of typed content and/or commands by users through interaction with the virtual keyboard displayed on the input interface 104 of the computing device 100. In such a case, the input management system 112 and the input recognition system 114 may be configured to display a keyboard panel on the input interface 104, and recognize and interpret typed input thereon as described in U.S. patent application Ser. No. 15/132,514 titled "System and Method for Multiple Input Management" filed claiming a priority date of 23 Feb. 2016 and/or in European Patent Application No. 16290214.2 titled "System and Method for Recognizing Handwriting Stroke Input" filed claiming a priority date of 4 Nov. 2016, both in the name of the present Applicant and/or Assignee and the entire contents of which are incorporated by reference herein.

Typing input may also be received and rendered as typeset ink by the input management system 114, or other application stored or accessed by the computing device 100 for example, from an integral, peripheral or otherwise connected physical keyboard, as an I/O device of the computing device 100.

A stroke is characterized by at least the stroke initiation location (e.g., "pen-down" location), the stroke termination location (e.g., "pen-up" location), and the path connecting the stroke initiation and termination locations. With respect to handwriting on-screen, for example, further information such as timing, pressure (if the display 102 of the device 100 is configured to provide information on such), angle at a number of sample points along the path may also be captured to provide deeper detail of the strokes. With respect to printed and displayed typeset ink, the elements (e.g., text characters) thereof are herein also considered to include ink 'strokes' based on the above definition.

The information representing the strokes of the input, be it handwriting or typing, is processed by the input management system 112 for rendering of the input strokes as digital or typeset ink, respectively. For example, the digital ink 306 as depicted in FIG. 4 may have been rendered from user interaction with the input interface 104, rather than from an image captured by the image capture device 103 or otherwise loaded to the memory 108 of the device 100, for example. The input recognition system 114 of the present system and method is configured to process stroke information for recognition and interpretation of the input. In the present system and method, this recognition and interpretation is performed by the input recognition system 114 after or as part of image processing or display/rendering of the digital/typeset ink. An example configuration of the input recognition system 114 and the recognition processing performed thereby is now described in relation to FIGS. 5 and 6.

FIG. 5 is a schematic pictorial of an example of the input recognition system 114. The input recognition system 114 includes stages such as preprocessing 116, recognition 118 and output 120. The preprocessing stage 116 processes the stroke information to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects may then be output 120 to the display 102, generally as a digital ink or typeset ink versions of the handwritten input (described later).

The recognition stage 118 may include different processing elements or experts. FIG. 6 is a schematic pictorial of the example of FIG. 5 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, tables, charts, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. and is the storage for all static data used by the language expert 126 to execute a language model. A language model can rely on statistical information on a given language. The linguistic information 130 is computed off-line, with or without adaption according to the results of recognition and user interactions, and provided to the linguistic expert 126. The language expert 126 aims at finding the best recognition path. In one example, the language expert 126 does this by exploring a language model such as final state automaton (FSA) representing the content of linguistic information 130. In addition to the lexicon constraint, the language expert 126 may use a language model with statistical information modeling for how frequent a given sequence of elements appears in the specified language or is used by a specific user to evaluate the linguistic likelihood of the interpretation of a given path of the segmentation graph.

Upon production of the recognized and interpreted output 120, the input management system 112 may cause the rendered display of the recognized content elsewhere on the display 102, such as a component of an active application of the computing device 100, in typeset ink, for example. The input management system 112 may cause display of the input content either directly or via communication of the input to the active application and/or operating system 110, for example, in a manner similar to that conventionally employed by operating systems and components and applications thereof For example, FIG. 4 shows a content display area 308 which may be a component of an active application of the computing device 100, for example. It is understood that the display area is merely an example, and other forms and configurations of a display zone, or use of the entire display of the device, are also applicable. In the example of FIG. 4, based on the recognition output 120 of the content represented by the digital ink 306, the input management system 112 causes display of corresponding content 310 in the display area 308 as digital objects in typeset ink. Display of the recognized content may be alternatively or additionally carried out on a device or system connected to the device 100.

The present system and method may produce these digital objects as 'ink objects'. Ink objects include links between the rendered display of the digital or typeset ink and the recognition candidates produced by the recognition processing, so that the displayed content is provided as interactive ink. This may be achieved as described in U.S. patent application Ser. No. 15/083,195 titled "System and Method for Digital Ink Interactivity" filed claiming a priority date of 7 Jan. 2016 in the name of the present Applicant and/or Assignee, the entire contents of which is incorporated by reference herein.

Upon the display of the recognized content, the display of the digital ink (whether rendered from handwritten input to the input interface 104 or loaded as image data from image capture device 103 and/or the memory 108 of the device 100, for example) and/or typeset ink (whether rendered from typed input to the input interface 104 or loaded as image data from image capture device 103 and/or the memory 108 of the device 100, for example) may be ceased by the input management system 112.

With respect to handwriting directly input to the user interface 104, for example, the stroke information for communication to the input recognition system 114 is easily ascertained from the hand-drawn path traced by the user, e.g., with a finger, gesture, pen. However, with respect to imaged handwriting, such path information is not known or easily ascertainable from the image data, which may be rendered as digital ink. For this reason, conventional ICR and IWR methods, such as those described in the background, have typically sought to find the skeleton of the imaged handwritten characters through thinning and other techniques. Similarly, since typeset ink content/text is not intrinsically printed or typed using 'strokes', stroke information is not readily ascertainable therefrom. For this reason, conventional OCR methods, such as those described in the background, have typically sought to find the skeleton of the imaged typeset characters through thinning and other techniques, or to directly learn the pixel distribution for each character without skeletonization.

It is possible, by treating the determined skeleton as the stroke information, to segment and process the skeleton using recognition processing (such as that of the input recognition system 114 described earlier) in order to recognize the skeletonized characters. However, the accuracy of this recognition may be limited not only due to the introduction of spurious artefacts through poor imaging, poor printing, poor handwriting, etc. (as discussed earlier) but also due to, in the case of handwriting, users naturally writing the same character or object (e.g., a letter, number, symbol) with slight to large variations, and the ability to link characters (e.g., cursive) and to overlap characters, which leads to incorrect skeletonization, and in the case of typing/printing, the very large variety of available typeset fonts and styles, such as the inclusion of serifs.

Figure 7A:
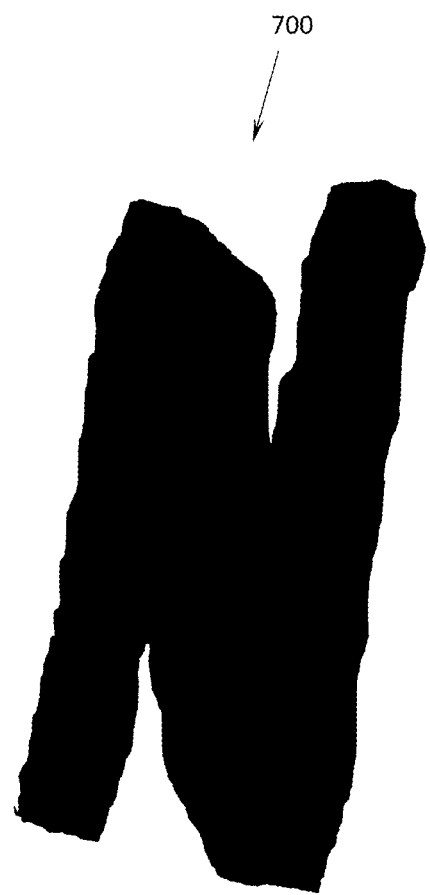
FIG. 7A shows an ink element of the digital ink of FIG. 4 in isolation.

For example, FIG. 7A shows an isolated 'ink' element 700 of the image or digital ink 306, which represents a character of the handwritten content 302 in isolation from the other characters. The ink element 700 is a text character, being the capitalized letter "N" that is the first letter of the word "Note" of the handwritten content 302. As can be seen, the 'ink' of the ink element 700 is reasonably 'thick', but easily discernible as the letter "N" by the reader.

Figure 7B:
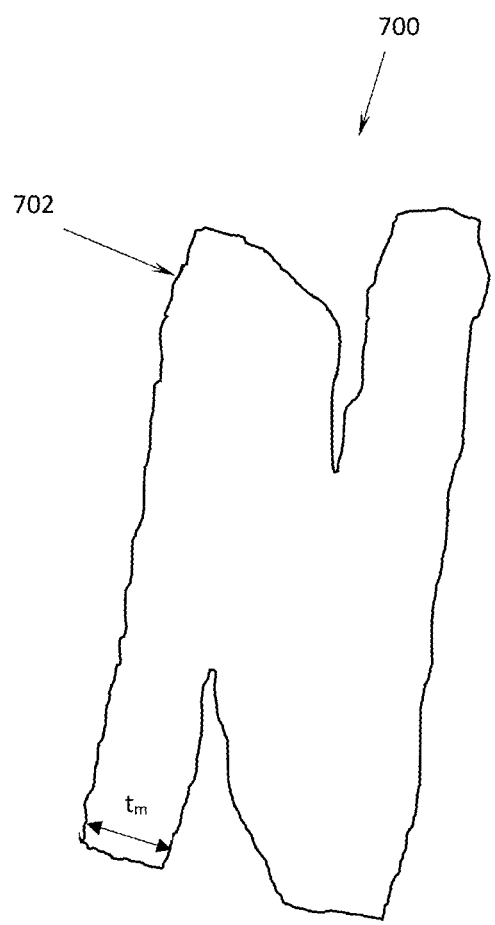
FIG. 7B shows the isolated ink element depicting its perimeter as determined in accordance with an example of the present system and method.

FIG. 7B shows the ink element 700 depicting a perimeter or contour 702 of the ink element 700. That is, in FIG. 7B, the internal 'ink' of the ink element 700 is omitted for illustration purposes only. The input management system 112, or the input recognition system 114, is configured to determine the perimeter 702 of the ink element 700 by determining the boundary pixels in the image or the rendered digital ink using, for example, well-known image processing techniques.

Figure 7C:
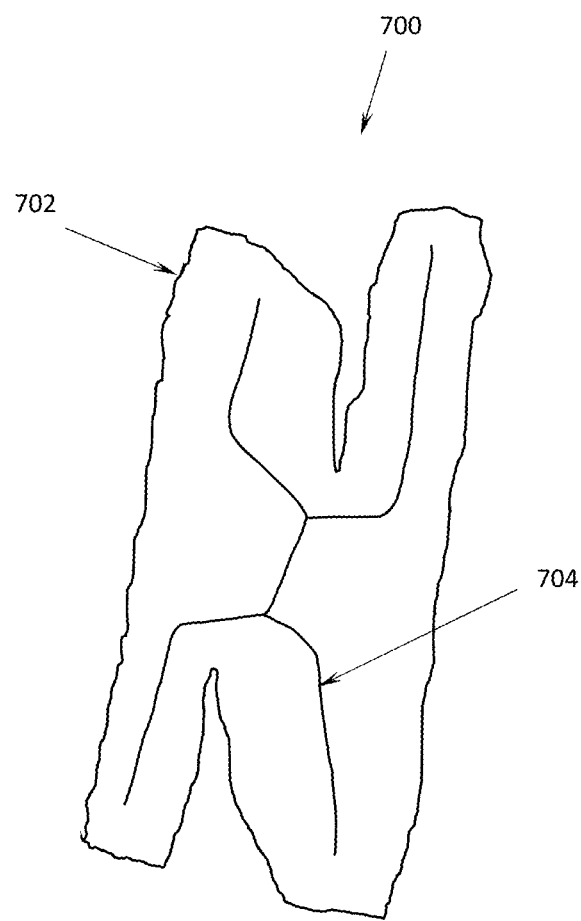
FIG. 7C shows the isolated ink element as shown in FIG. 7B and depicts a skeleton of the ink element as determined an example skeletonization method.

FIG. 7C shows the ink element 700, as contoured in FIG. 7B, depicting a skeleton 704 deduced for the ink element 700 using, for example, a conventional technique such as described in the background (e.g., a contour-based method using the contour 702). As can be seen, in the present example, due to at least the relative thickness of the ink element 700, the determined skeleton 704 does not present stroke information that represents the letter "N". As such, if the skeleton 704 was input as stroke information to the input recognition system 114, in the recognition stage 118 the segmentation of the skeleton 704 may not result in the letter "N" being provided with a sufficient probability score for recognition of this letter, and therefore ultimately recognition of the word "Note". Indeed, in the segmentation performed by the segmentation expert 122 of the recognition stage 118 several hypotheses of characters may result from the segments of the skeleton 704, including the characters "y" and "n", or "u", "i" and "n", or "x". Of these possible segmentations, the recognized combination of "y note" for the ink elements of the content 302 could result.

In order to reduce the impact of incorrect skeletonization on the recognition process, the present system and method generates the skeleton of the digital ink characters in a manner which seeks to replicate the handwritten strokes of the "raw ink", i.e., the ink that was originally imaged and/or rendered as the digital ink, or of the typeset ink characters in a manner which seeks to synthesize strokes of the printed/typeset ink.

This 'penning' of the image or displayed (e.g., digital or typeset) ink is achieved by extracting a trajectory of a pen from the text in the images or displayed ink. Herein, the term "pen" is used to represent the function of an apparatus or device for causing physical marking of a physical surface or virtual marking of a virtual surface, such as an ink pen, a non-ink pen, a printing head or device of a printing system or device or apparatus which prints using ink, toner, laser, etc., an electronic pen, a marking pencil, a non-marking pencil, a passive stylus, an active stylus, a finger, and any other device or tool for making or capturing handwritten content or commands depending on the medium of input, e.g., paper, touchscreen, tracking surface.

Thus, for handwritten input, whether from a text image or digital ink, locations where the pen traveled during the handwriting by the user to result in the image or digital ink is determined or reconstructed by the input management system 112 and/or input recognition system 114. For typeset input, whether from a text image or typeset ink, locations where the pen could have traveled during the printing or rendering resulting in the image or typeset ink is determined or simulated by the input management system 112 and/or input recognition system 114.

The pen trajectory is defined as a set of one or more strokes created by the pen. The task of recovering the pen trajectory in images can be approximated by the skeletonization process. That is, the pen trajectory or set of stroke(s) constitutes the skeleton of one or more text characters. In the present system and method, the skeleton of text in the image is extracted by modeling the pen stroke(s) which resulted in the image, for example.

With respect to the pen trajectory, the skeletonized strokes may be defined (i) in pixel widths, in a range of about one to several pixel widths, with a width of one pixel being optimum, up to a thickness or width of the ink element (such as a reference thickness, described later); (ii) as having a substantially constant width (however a variable width is possible); (iii) as being able to overlap with other strokes or itself, and (iv) as having two ends.

In this method, the input management system 112, and/or the input recognition system 114, is configured to determine the stroke information of each isolated imaged or displayed ink element (which may represent one or more text characters) by determining, for each isolated element, a number or series of common (e.g., substantially equal) pen widths which 'fit' in the perimeter or contour of the element at a plurality of locations in that element. Several examples of the present system and method is described below in relation to FIGS. 8 to 12.

In the examples of the present system and method, the described processing of the input image or rendered digital ink may be performed by the input management system 112 with the resulting stroke information communicated to the input recognition system 114, as described earlier. Alternatively, or additionally, the input management system 112 may communicate the image or displayed ink data to the input recognition system 114 which processes the data to first produce the stroke information, e.g., in the preprocessing stage 116, which is then recognition processed by the recognition stage 118, as described earlier.

Figure 8A:
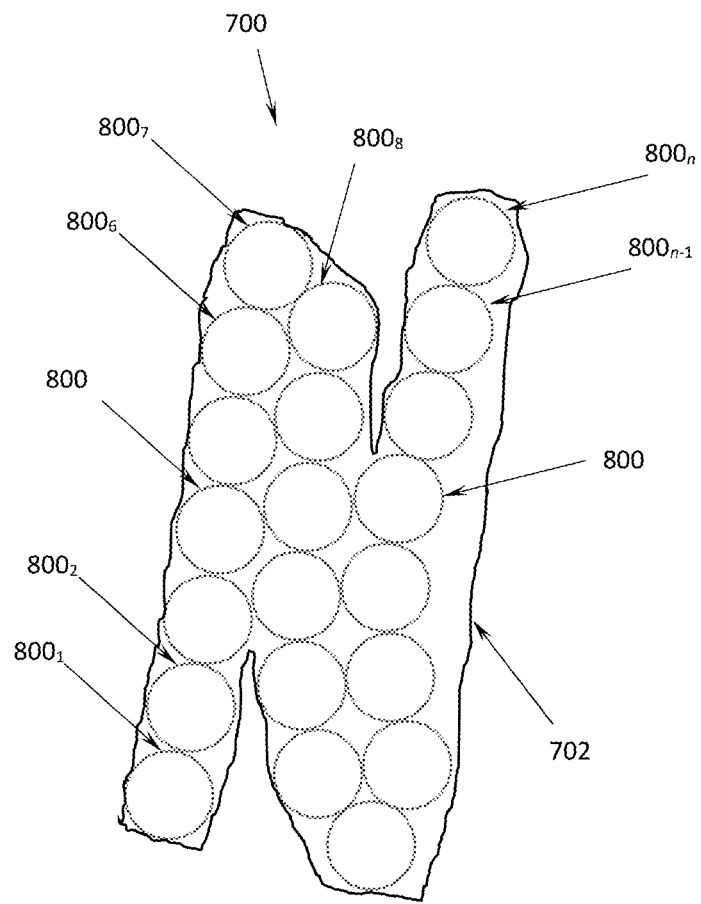
FIG. 8A shows the isolated ink element as shown in FIG. 7B and depicts a series of pen units as determined in accordance with an example of the present system and method.

FIG. 8A shows the ink element 700 of FIG. 7 with a series of pen widths 800 defined therein in accordance with an example of the present system and method. In particular, based on the determined ink element perimeter 702, a pen or stroke width is determined that repeatedly 'fits' within the character perimeter 702 in the series 800 of n pen units $800_n$, where n is an integer value beginning at 1. As shown in FIG. 8A, a first pen unit $800_1$ is followed by a second pen unit $800_2$, which is followed by a third pen unit and so on, until a penultimate pen unit $800_{n-1}$ and the ultimate or final pen unit $800_n$ of the pen unit series 800. Each pen unit of the series has (substantially) the same dimensions or size and is positioned relative to the ink element perimeter and the other pen units. Accordingly, with respect to determining a number or series of pen units that 'best' fits the ink element, the present system and method determines an optimum combination of the pen unit dimension (first characteristic) and the pen unit positions (second characteristic).

The pen unit represents the width of the pen which formed, or could have formed, the stroke of the ink element. In FIG. 8A (and FIG. 8B), the pen units 800 are depicted as (at least approximate) circles, such that each pen unit 800 defines a radius of the pen width. However, other or multiple polygon forms are possible, such as ellipse, square, rectangles, etc., in such cases the pen width is defined as at least one dimension of the polygon form.

In the present example, with respect to the first characteristic, the dimension of each pen unit of the series, e.g., the unit width or radius in the case of the substantially circular pen unit, may be determined based on the dimensions of the perimeter of the isolated imaged or displayed ink element. That is, the pen unit width may be defined by one or more thickness values of a range of thicknesses of the perimeter as determined by the input management system 112, or the input recognition system 114. The thickness is defined as the linear distance between like-oriented (e.g., substantially horizontal, substantially vertical, or some angle therebetween) opposing parts of the perimeter. As can be seen from the depiction of the handwritten ink in the drawings, a range of thicknesses is present for each ink element, due to variability in the strokes written by hand which is not necessarily attributable to the character(s) represented by the handwritten ink elements. Similarly, the different available fonts and styles for typesetting results in ink elements of variable thickness not necessarily attributable to the character(s) represented by the typeset ink elements.

The dimension used for the pen unit width may be based on a reference thickness of the ink element. The reference thickness may be a value determined from the range of thicknesses of the ink element, such as the minimum thickness, the average thickness, the mean thickness, with or without a scaling factor applied. For example, FIG. 7B shows the minimum thickness $t_m$ of the perimeter 702 of the ink element 700, which is the reference thickness for the pen units 800 shown in FIG. 8A.

In the present example, with respect to the second characteristic, the position of each pen unit of the series is determined so that an optimum or best number of pen units are fitted in the perimeter of the imaged or displayed ink element at the best pen unit width while a linear progression of the pen unit series is formed and the interior space of the ink element is substantially 'filled' with the pen units, e.g., as shown in FIG. 8A. This positioning is determined with respect to the relative position of each pen unit with at least one dimension of the ink element perimeter (first criteria) and the relative position of each pen unit with one or more adjacent pen units (second criteria).

With respect to the first criteria, the initial (first) pen unit of the series may be positioned at one extent or termination of the ink element in the perimeter and at least some of the pen units of the series may be positioned to contact one or more points of the perimeter of the ink element at one or more respective points of the pen unit with or without a degree of overlap, or to be spaced (by a predetermined and/or (UI) settable space unit) from the perimeter of the ink element. An extent or termination is defined as a truncation of the general shape of the ink element, which corresponds with terminations of characters, such as the bottom of the letter "T" and the ends of the bar of the "T" in the content 302. If such a termination is not present, such as in shapes representing looped characters, like the letter "O ", an initial location may be selected arbitrarily or at a predetermined position, such as at a position represented by the reference thickness.

The extent of the ink element or other initial location selected for this initial positioning may be pre-selected (and settable for example via a user interface (UI) of the input management system 112), or arbitrarily selected. In either case, the selection may be made based on handwriting or typeset style. That is, for left-to-right written/typed languages, the initial extent may be at the leftmost extent of the ink element. For example, in FIG. 8A the position of the first pen radius $800_1$ of the series 800 is determined to be at the lower left position of the ink element 700. Alternatively, or additionally, for ink elements having more than one extent, the initial location may be iteratively selected so that a best fit pen unit series is attempted for each iteration.

Based on such an iterative approach, the present system and method may cause multiple hypotheses for the pen trajectory for each iteration to be routed to the recognition stage 118 of the input recognition system 114, or may select one of the resulting trajectories based on predetermined and/or settable characteristics defining best fit, such as the maximum number of pen units in the series that can be used to substantially fill the ink element in its perimeter or boundaries.

Regarding the relative positioning of the pen units and the perimeter of the ink element, the point(s) of contact or spacing may be determined based on a certain directional side of the perimeter, and this directional alignment may be continued for pen units that are adjacent previous non-series ordered pen units. For example, in FIG. 8A the initial pen unit $800_1$ is aligned with the left boundary or side of the perimeter 702 of the ink element 700, and the subsequent pen units $800_2$, etc. are similarly aligned with respect to the perimeter 702.

Once it is not possible to align a subsequent pen unit with this ink element perimeter side, since the pen unit will not fit within the perimeter once appended to the previous pen unit in satisfaction of the second criteria (described below), this pen unit is positioned to be aligned with at least one of the previous pen units in the series-order, thereby forming a curve or change in direction in the series progression. For example, in FIG. 8A the pen unit $800_8$ is aligned with the previous pen units $800_6$ and $800_7$ rather than the perimeter 702, thereby defining a change in direction of the pen unit series, or an inflection point in the pen stroke represented thereby. Such alignments are an example, and other alignments for positioning of the pen units are possible.

With respect to the second criteria, each pen unit of the series may be positioned to contact the previous and/or next pen unit of the series with or without a degree of overlap, or to be spaced (by a space value that is predetermined and/or settable for example via the UI) from the previous and/or next pen unit of the series, or a combination thereof, while satisfying the first criteria. Further, pen units that are not in series-order but are otherwise adjacent, for example, due to curves or changes in direction in the series progression as shown in FIG. 8A, are positioned to satisfy similar contact or non-contact attributes.

Based on the discussed examples of the first and second characteristics, FIG. 8A therefore illustrates the best fit pen unit series 800 for the example of the ink element 700 with respect to the present example of the present system and method. The present system and method may determine the best fit pen series or path as described above by satisfying the two characteristics in a single step or find the best fit pen series or path by performing a series of steps which iterate between the first and second characteristics. Such an iterative process may be an iterative energy minimization method for estimating the handwritten character skeletons which alternates between estimating the stroke width of the pen (first characteristic) and the pen positions (second characteristic) in an expectation maximization setting.

That is, in an initial iteration (first step), an initial dimension value of the pen unit is estimated. Then, in the next iteration (second step), the series of pen units with the initial dimension are positioned with respect to the ink element at positions selected/determined to satisfy the first and second criteria. Then, in the next iteration (third step), a new dimension value of the pen unit is selected/determined. Then, in the next iteration (fourth step), the series of pen units with the new dimension are positioned with respect to the ink element at positions selected/determined to satisfy the first and second criteria, and so on.

The initial pen unit dimension value of the first iteration may be estimated based on a predetermined and/or (UI) settable value or the dimensions of the ink element (e.g., a percentage or otherwise scaled value of the ink element reference thickness, determined as described earlier). In one example, the input management system 112, or the input recognition system 114, estimates the first iterative pen unit dimension value as a relatively small value which may be based on the skeleton width (as per definition (i) earlier), or a scaled value of one or more dimensions of the ink element, e.g., a percentage (such as about 5% to about 10%) of the height of the ink element (e.g., as measured from a bounding box of the ink element determined by the ink management system 112 or input recognition system 114).

The iterations of the pen unit dimension values may progress in a descending or ascending manner, with a linear difference or gradient applied for each iteration (e.g., by applying an additive or subtractive scaling factor or constant, that may be predetermined and/or (UI) settable) or a non-linear difference or gradient applied for each iteration (e.g., by applying a percentage, or an increasing or decreasing scaling factor, that may be predetermined and/or (UI) settable). In the present example, the initial value of the first iteration pen unit dimension may be linearly increased with each iteration by one to several pixels or a percentage of the ink element dimensions, for example.

The iterations of the first characteristic in the present example may be ceased when the pen unit dimension reaches a certain value or an optimum fit of the iterated series of pen units is found (described below), such as illustrated in FIG. 8A. The certain value may be based on the ink element, such as the reference thickness.

The fit of the pen unit series of each iteration of the second characteristic may be analyzed by the input management system 112 at each iteration or when the last possible iteration is determined. The fit may be determined through measurement or other determination of attributes of the pen unit series, such as areal percentage of fill in the ink element boundaries by the positioned pen units, the number of changes of direction in the series progression, etc. These attributes may be compared with pre-determined and/or (UI) settable threshold values or relatively compared against the attributes determined for the next iteration or a number of subsequent iterations, in order to determine the pen unit series having the best fit. In this way, the correct pen unit series, and therefore correct pen trajectory (described below), may be converged upon with each iteration.

Once the best fit pen unit series is determined for each (or all) ink element(s), the input management system 112, or the input recognition system 114, determines the skeletonized stroke of that (or each) ink element, having a pixel based (or non-pixel based) thickness as described earlier. In the simplest form, the skeleton is determined by forming a series of lines that each connect a pen unit of the series to the adjacent pen unit in the series-order, where each line is also connected to the adjacent (i.e., previous and/or subsequent) line or lines. For example, FIG. 8B shows the pen unit series 800 with a skeleton or stroke 802 formed thereon with the centers of the n circular pen units 800 connected with n−1 skeleton or stroke portions, e.g., as shown the centers of the adjacent pen units $800_1$ and $800_2$ are connected with a stroke portion $802_1$ and the centers of the adjacent pen units $800_{n-1}$ and $800_n$ are connected with a stroke portion $802_{n-1}$.

Figure 8B:
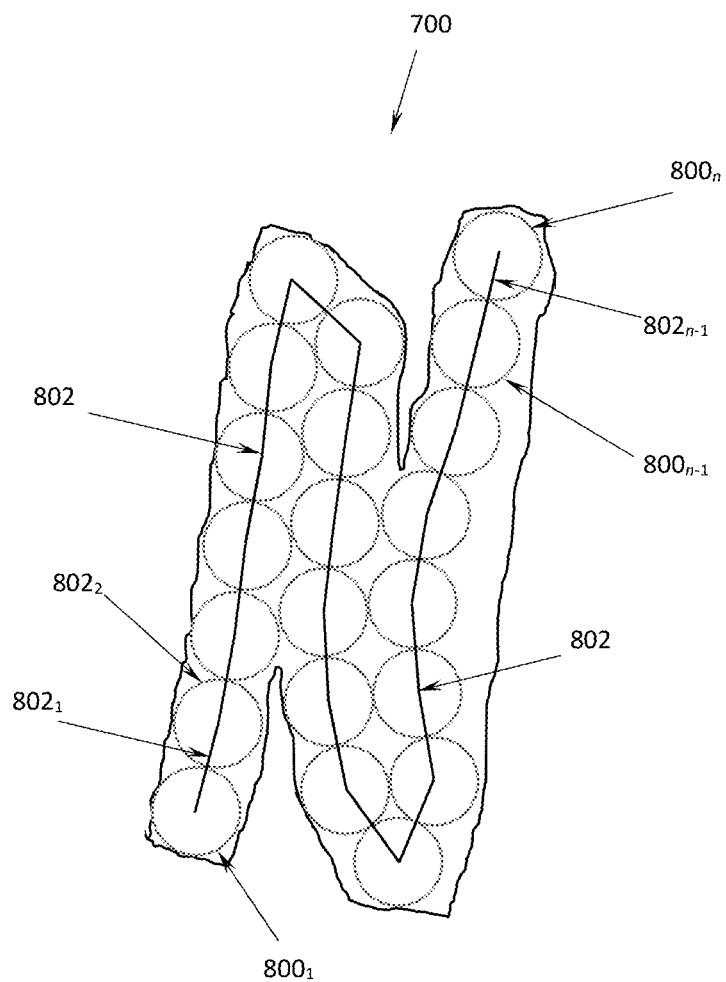
FIG. 8B shows a skeleton through the pen unit series of FIG. 8A as determined in accordance with an example of the present system and method.

As can be seen from FIG. 8B, the determined skeleton 802 presents stroke information that represents the letter "N" as intended by the user, unlike the skeleton 704 determined in FIG. 7B using conventional skeletonization. As such, in the recognition stage 118 of the input recognition system 114 the segmentation of the skeleton 802 will result in the letter "N" being provided with a sufficient probability score for recognition of this letter, and therefore ultimately recognition of the word "Note" of the imaged handwritten content 302.

It is noted that the depictions of the elements in FIG. 8 are merely for explanation purposes, and are not necessarily shown to the user via the display 102 of the device 100 nor represent actual processing results, for example.

In the example of the present system and method described with respect to FIG. 8, the characters of the rendered text are determined for recognition processing by (iteratively) defining a series of simulated pen units in each ink element of the text through balancing of the first and second characteristics of the pen unit dimension and the pen unit positions, respectively. This example thereby relies on finding a series of pen units. In an alternative, or additional, example of the present system and method, a number of pen units are determined for optimally 'filling' the ink elements based on criteria other than being in a series. This example is now described with reference to FIG. 9.

Figure 9A:
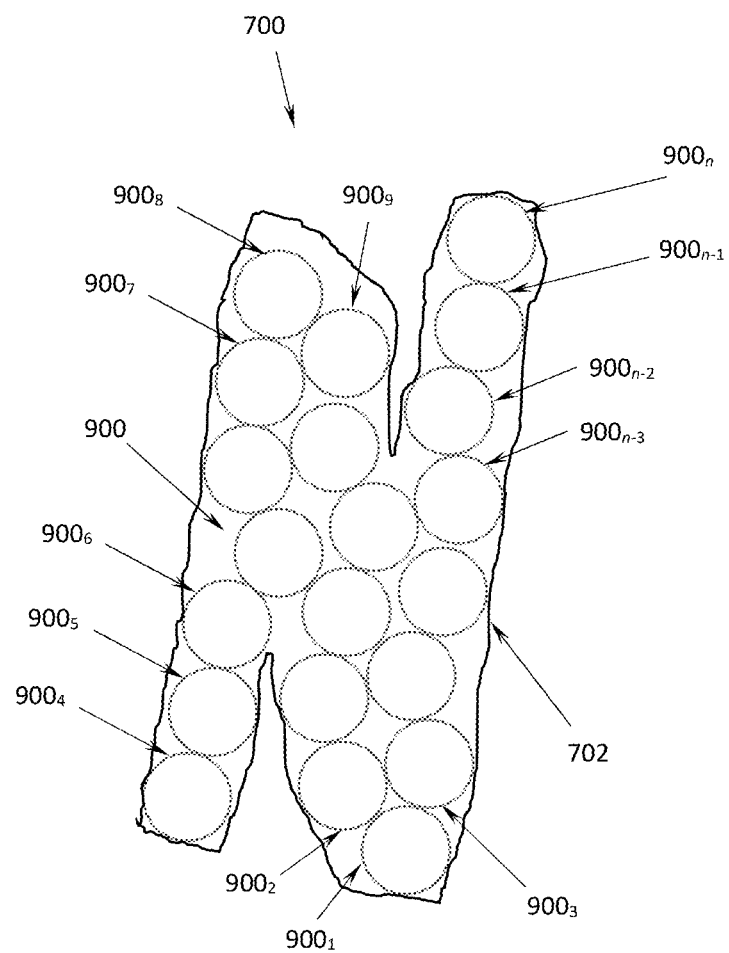
FIG. 9A shows the isolated ink element as shown in FIG. 7B and depicts a number of pen units as determined in accordance with an example of the present system and method.

FIG. 9A shows the ink element 700 of FIG. 7 with a number of pen widths 900 defined therein in accordance with the present example of the present system and method. As before, the pen unit represents the width of the pen which formed, or could have formed, the stroke of the ink element. In FIG. 9, the pen units 900 are depicted as (at least approximate) circles, such that each pen unit 900 defines a radius of the pen width. However, other or multiple polygon forms are possible, such as ellipse, square, rectangles, etc., in such cases the pen width is defined as at least one dimension of the polygon form.

Like the earlier example, the present example of the present system and method determines an optimum combination of the pen unit dimension (first characteristic) and the pen unit positions (second characteristic), in order to determine a number of the pen units that 'best' fits the ink element. That is, with respect to the first characteristic, based on the determined ink element perimeter 702, a pen or stroke width is determined that 'fits' in the character perimeter 702 and a number n of pen units $900_n$, where n is an integer value, having that pen width are filled in the perimeter 702, as shown in FIG. 9. The dimension used for the width of the pen units 900 may be based on the reference thickness $t_m$ of the perimeter 702 of the ink element 700.

However, with respect to the second characteristic, while the position of each pen unit 900 is determined so that an optimum or best number of pen units are fitted in the perimeter of the imaged or displayed ink element 700 at the best pen unit width, unlike the earlier example a linear progression of the pen unit is not formed. That is, the pen units 900 are not distributed in a series, rather they are filled in the contour 702 from an initial 'seed' position (e.g., the position of a first pen unit $900_1$ in the illustrated example) with subsequent pen units (e.g., a second pen unit $900_2$, a third pen unit $900_3$, up to a pen unit $900_{n-1}$ and a (final) pen unit $900_n$) positioned relative to the ink element perimeter (the first criteria) and the already positioned pen units (the second criteria) so as to fit the maximum number of possible pen units in the perimeter. In the illustrated case of circles, the placement of the pen units 900 models the distribution of such shapes, or three-dimensional versions thereof, e.g., spheres, under the force of gravity within a container, for example.

With respect to the first criteria, the 'seed' or initial (first) pen unit $900_1$ may be positioned at one extent or termination of the ink element in the perimeter and at least some of the other pen units may be positioned to contact one or more points of the perimeter of the ink element at one or more respective points of the pen unit with or without a degree of overlap, or to be spaced (by a predetermined and/or (UI) settable space unit) from the perimeter of the ink element. If a termination is not present, an initial location may be selected arbitrarily or at a predetermined position, such as at a position represented by the reference thickness.

The extent of the ink element or other initial location selected for this initial positioning may be pre-selected and/or (UI) settable based on the model of filling used, e.g., gravity, or arbitrarily selected, or based on handwriting or typeset style. In FIG. 9A, the position of the first pen radius $900_1$ is determined to be at the lowest (gravitational) position of the ink element 700. Alternatively, or additionally, for ink elements having more than one extent, the initial location may be iteratively selected so that a best fit pen unit series is attempted for each iteration.

Based on such an iterative approach, the present system and method may cause multiple hypotheses for the pen trajectory for each iteration to be routed to the recognition stage 118 of the input recognition system 114, or may select one of the resulting trajectories based on predetermined and/or (UI) settable characteristics defining best fit, such as the maximum number of pen units that can be used to substantially fill the ink element in its perimeter or boundaries.

With respect to the second criteria, each subsequent pen unit may be positioned to contact the previous and/or next pen unit of the series with or without a degree of overlap, or to be spaced (by a space value that is predetermined and/or (UI) settable) from the previous and/or next pen unit of the series, or a combination thereof, based on the placement model being used and while satisfying the first criteria.

Based on the discussed examples of the first and second characteristics, FIG. 9A therefore illustrates the best fit number of pen units 900 for the example of the ink element 700 with respect to the present example of the present system and method. The present system and method may determine the best fit number of pen units as described above by satisfying the two characteristics in a single step or by performing a series of steps which iterate between the first and second characteristics. Such an iterative process may be an iterative energy minimization method for estimating the handwritten character skeletons which alternates between estimating the stroke width of the pen (first characteristic) and the pen positions (second characteristic) in an expectation maximization setting, as in the previous example.

The fit of the pen units of each iteration of the second characteristic may be analyzed by the input management system 112 at each iteration or when the last possible iteration is determined. The fit may be determined through measurement or other determination of attributes of the pen units, such as areal percentage of fill in the ink element boundaries by the positioned pen units. These attributes may be compared with pre-determined and/or (UI) settable threshold values or relatively compared against the attributes determined for the next iteration or a number of subsequent iterations, in order to determine the number of pen units having the best fit. In this way, the correct number of pen units, and therefore correct pen trajectory (described below), may be converged upon with each iteration.

Once the best fit number of pen units is determined for each (or all) ink element(s), the input management system 112, or the input recognition system 114, determines the skeletonized stroke of that (or each) ink element, having a pixel based (or non-pixel based) thickness. In the present example of the present system and method, as a series of pen units is not determined (as in the example of FIG. 8) different criteria is used for determining the skeletonized stroke. In particular, initial stroke (sub-)sections (first sections) are first determined (first or initialization step) and then joining stroke (sub-)sections (second sections) are determined that join or link the initial stroke sections (second or joining step).

Figure 9B:
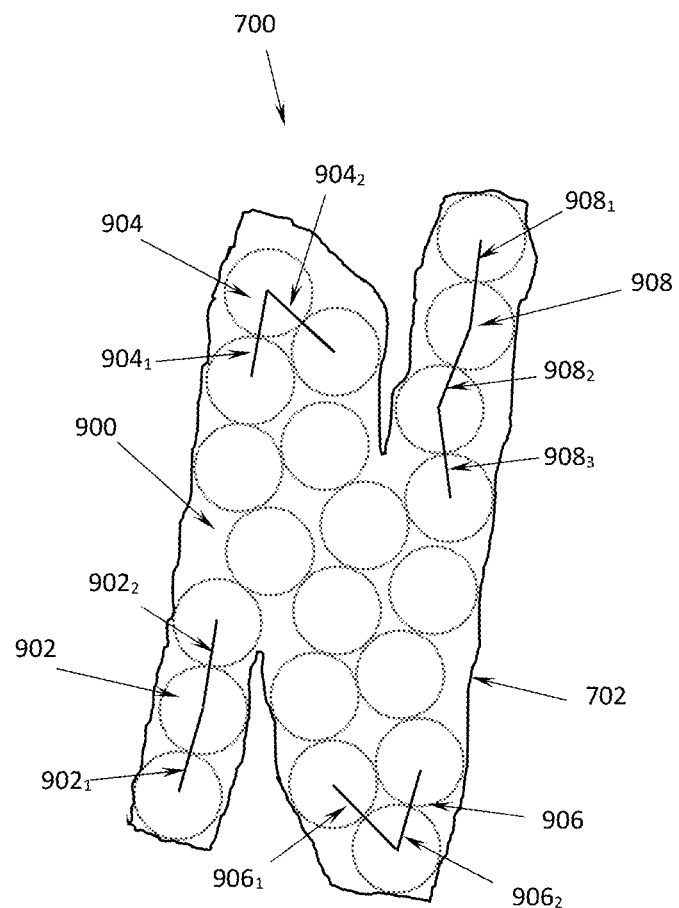
FIG. 9B shows initial stroke sections as determined in accordance with an example of the present system and method for some of the pen units of FIG. 9A.

FIG. 9B shows example results of the stroke initialization step. In this first step, a (first) stroke sub-section is determined for each pen unit that has two or less neighboring or adjoining pen units (first criteria) from a dimensional or geometrical feature of the pen unit, and sub-sections that are connected, or at least determined for the same pen unit, are combined or determined as a (first) stroke section. Neighboring pen units are defined using a (first) separation or distance threshold or tolerance, which is for example based on the geometry of the pen units, from the geometrical feature of the pen unit, such as the center of the pen unit.

The (first) separation threshold or tolerance may be a pre-determined value, e.g., two pen widths, or range of values, e.g., two or less pen widths, and/or settable (e.g., automatically and/or via the UI). For example, for circular pen units, a separation threshold or tolerance from the center of the circular pen unit of about one radius to about two radii may be used. A threshold of one radius amounts to the pen units being adjoined or touching in order to qualify, e.g., the pen units are not separated, whereas a threshold of greater than one radius allows for some separation of the pen units. In the present example of FIG. 9, as there are spaces between some of the pen units 900, a separation threshold of about 1.5 radii of the circular pen units 900 defined from the centers of the pen units 900 is used.

Accordingly, for the example distribution of the pen units 900, the input management system 112 (or the input recognition system 114) determines an initial stroke section 902 from combining or connecting a stroke sub-section $902_1$ defined between the centers of adjacent pen units $900_4$ and $900_5$ (see FIG. 9A) and a stroke sub-section $902_2$ defined between the centers of the pen unit $900_5$ and an adjacent pen unit $900_6$, an initial stroke section 904 from combining or connecting a stroke sub-section $904_1$ defined between the centers of adjacent pen units $900_7$ and $900_8$ and a stroke sub-section $904_2$ defined between the centers of the pen unit $900_8$ and an adjacent pen unit $900_9$, an initial stroke section 906 from combining or connecting a stroke sub-section $906_1$ defined between the centers of the adjacent pen units $900_1$ and $900_2$ and a stroke sub-section $906_2$ defined between the centers of the adjacent pen units $900_1$ and $900_3$, and an initial stroke section 908 from combining or connecting a stroke sub-section $908_1$ defined between the centers of the adjacent pen units $900_n$ and $900_{n-1}$, a stroke sub-section $908_2$ defined between the centers of the pen unit $900_{n-1}$ and an adjacent pen unit $900_{n-2}$, and a stroke sub-section $908_3$ defined between the centers of the pen unit $900_{n-2}$ and an adjacent pen unit $900_{n-3}$, as shown in FIG. 9B.

As can be seen, by using the first criteria of the present example, stroke sections at terminal portions and points of inflection of the ink element 700 are determined. The first criteria of pen units having two or less neighboring pen units is an example, and more or less neighboring pen units may be defined for the first criteria.

Figure 9C:
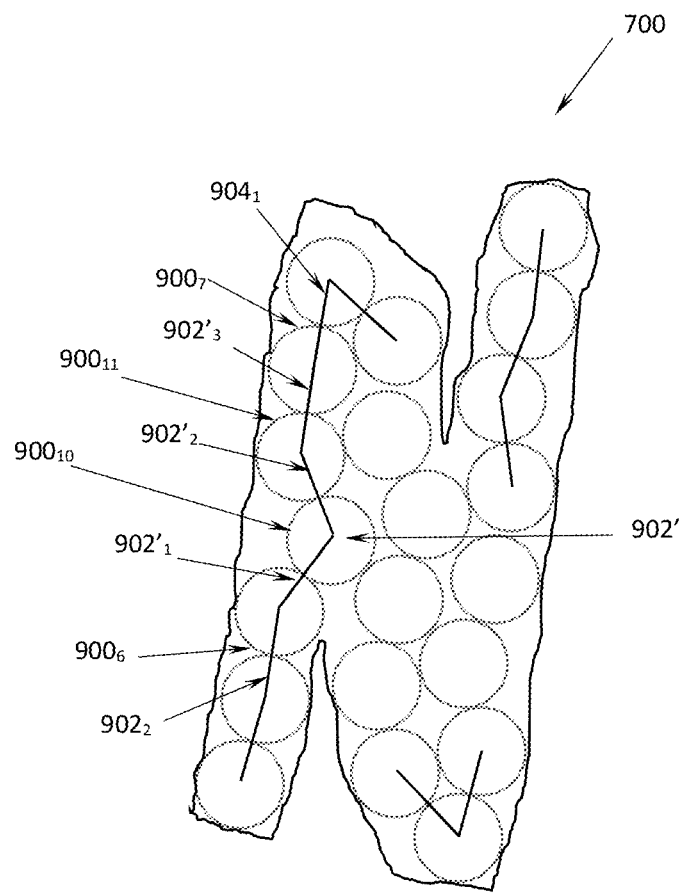
FIGS. 9C-9E progressively show joining stroke sections as determined in accordance with an example of the present system and method for some of the pen units of FIG. 9B.
Figure 9D:
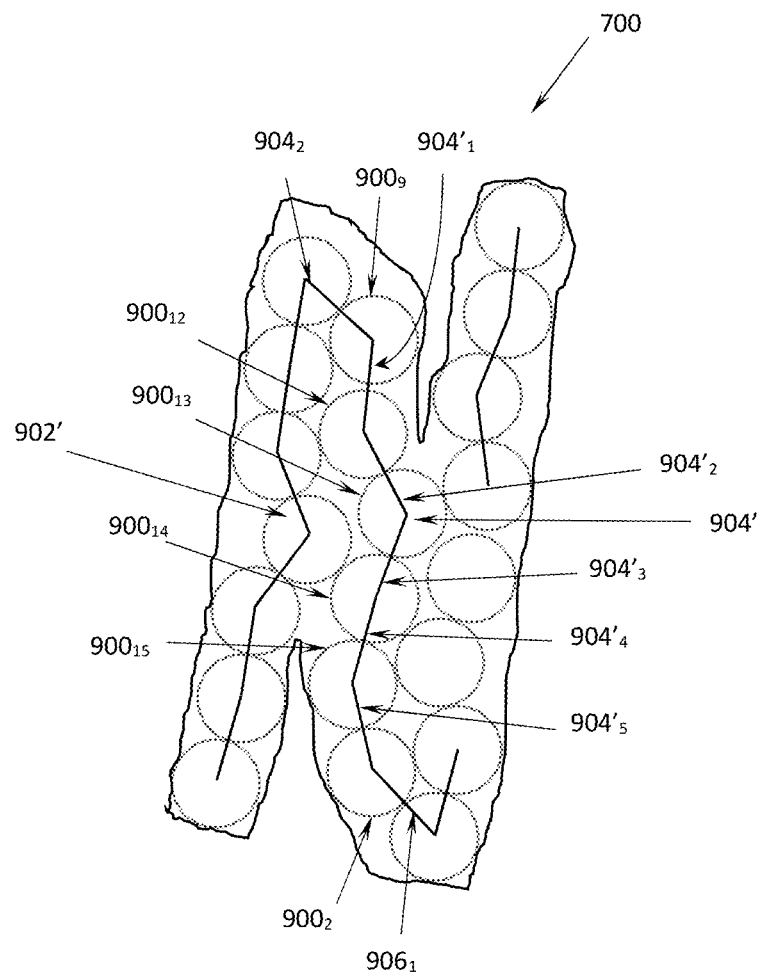
Figure 9E:
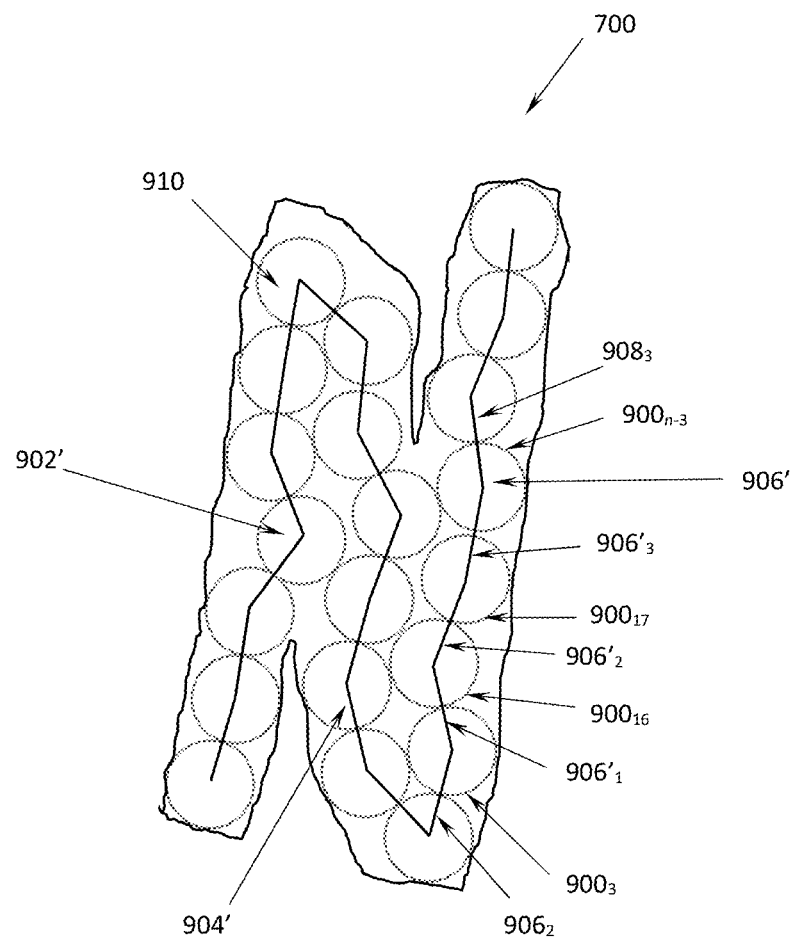

Once the initialization step has determined all possible initial stroke sections, the joining step is performed to join at least some of the initial stroke sections, or in other words, to connect at least some of the remaining pen units with adjacent or neighboring pen units. FIGS. 9C-9E show certain results of the stroke joining step, with FIG. 9E showing the total example result of a skeletonized stroke 910. In this second step, a (second) stroke sub-section is determined for any pen units that have not been connected to neighboring or adjoining pen units (second criteria) from the geometrical feature of the pen units, and sub-sections that are connected, or at least determined for the same pen unit, are combined or determined as a (second) stroke section.

Neighboring pen units are defined using a geometric feature of the initial (first) stroke section(s) and a (second) distance or separation threshold or tolerance from the geometrical feature of the pen unit, such as the center of the pen unit, and are connected with the determined stroke sub-sections between those geometrical features. That is, unlike the use of the (first) separation threshold in the initialization step, in this second step, determination of the joining stroke sub-sections is made based not only on a distance threshold or tolerance but also at least based on geometric features of the initial (first) stroke section(s), and more particularly on geometric features of the (first) stroke sub-section(s) making up the initial (first) stroke section(s). With respect to the geometric features, in one example, the direction of each of the (first and second) stroke sub-sections may be used by the input management system 112 (or the input recognition system 114) to determine a directional parameter or relationship, e.g., a vector, of one or more stroke sub-sections accorded to the pen units, including a pen unit for which a possible new stroke sub-section is to be determined.

For example, referring to FIG. 9B, the pen units $900_4$, $900_5$ and $900_6$ have the stroke sub-sections $902_1$ and $902_2$. The directions of these stroke sub-sections $902_1$ and $902_2$ are used to determine a vector (third criteria), with or without weightings applied to the individual directions. For example, gradient weighting factors may be applied where the stroke sub-section of the pen unit having only one stroke sub-section (e.g., the pen unit $900_6$) is given a higher weight in order to simulate the movement of a pen during handwriting, e.g., a greater weighting may be applied to the direction of the 'later' stroke sub-section $902_2$ than to the direction of the 'earlier' stroke sub-section $902_1$. The number of subsequent or connected stroke sub-sections used to determine the stroke vectors may be a pre-determined number, such as two or three, and/or may be set (automatically or via the UI) depending on the success of subsequent recognition processing, for example.

The determined vectors are used to determine if any pen units are positioned in a projected path of the vector within the (second) distance threshold. This distance threshold or tolerance may be a pre-determined value, e.g., two pen widths, or range of values, e.g., two or less pen widths, and/or settable (e.g., automatically and/or via the UI). For example, for circular pen units, a distance threshold or tolerance from the center of the circular pen unit of about one radius to about two radii may be used. A threshold of one radius amounts to the pen units being adjoined or touching in order to qualify, e.g., the pen units are not separated, whereas a threshold of greater than one radius allows for some separation of the pen units. In the present example of FIG. 9, as there are spaces between some of the pen units 900, a distance threshold of about 1.5 radii of the circular pen units 900 defined from the centers of the pen units 900 is used. The separation threshold of the initialization step and the distance threshold of the joining step may be the same parameter as set by or via the input management system 112, or the input recognition system 114.

Further, the projected path of the determined vector is determined within a tolerance area value (fourth criteria) which allows for a tolerated direction deviation from the vector in order to take into account the natural variability of handwritten strokes. For example, the tolerance area value may be provided as an angle of deviation from the vector, e.g., from about zero degrees to about 60 degrees. In the illustrated example of FIG. 9, a tolerance area value of about 50 degrees is used. In this way, any pen unit within the tolerated area and within the distance threshold from the pen unit of interest will have a joining stroke sub-section defined therefor. Then, for each determined joining stroke sub-section, a new vector is determined and the process repeated to find any pen unit for definition of a subsequent joining stroke sub-section.

Accordingly, for the example distribution of the pen units 900, the input management system 112 (or the input recognition system 114) determines a stroke section 902' from combining or connecting a stroke sub-section $902'_1$ defined between the centers of the pen unit $900_9$ and an adjacent pen unit $900_{10}$, a stroke sub-section $902'_2$ defined between the centers of adjacent pen units $900_{10}$ and $900_{ii}$, and a stroke sub-section $902'_3$ defined between the centers of the adjacent pen units $900_{10}$ and $900_7$, as shown in FIG. 9C.

Further, a stroke section 904' is determined from combining or connecting a stroke sub-section $904'_1$ defined between the centers of the pen unit $900_9$ and an adjacent pen unit $900_{12}$, a stroke sub-section $904'_2$ defined between the centers of the pen unit $900_{12}$ and an adjacent pen unit $900_{13}$, a stroke sub-section $904'_3$ defined between the centers of the pen unit $900_{13}$ and an adjacent pen unit $900_{14}$, a stroke sub-section $904'_4$ defined between the centers of the pen unit $900_{14}$ and an adjacent pen unit $900_{15}$, and a stroke sub-section $904'_5$ defined between the centers of the adjacent pen units $900_{15}$ and $900_2$, as shown in FIG. 9D.

Further still, a stroke section 906' is determined from combining or connecting a stroke sub-section $906'_1$ defined between the centers of the pen unit $900_3$ and an adjacent pen unit $900_{16}$, a stroke sub-section $906'_2$ defined between the centers of the pen unit $900_{16}$ and an adjacent pen unit $900_{17}$, and a stroke sub-section $906'_3$ defined between the centers of the adjacent pen units $900_{17}$ and $900_{n-3}$, as shown in FIG. 9E. It is noted that the depicted views of the determined stroke sections are separated in FIGS. 9C-9E merely for ease of comprehension, and do not necessarily indicate an order of processing.

As can be seen, by using the second criteria of the present example, stroke sections between the terminal portions and points of inflection of the ink element 700 are determined. That is, the joining stroke section 902' connects to, or has at least sub-sections for the same pen units as, the stroke sub-section $902_2$ of the initial stroke section 902 and the stroke sub-section $904_1$ of the initial stroke section 904, the joining stroke section 904' connects to, or has at least sub-sections for the same pen units as, the stroke sub-section $904_2$ of the initial stroke section 904 and the stroke sub-section $906_1$ of the initial stroke section 906, and the joining stroke section 906' connects to, or has at least sub-sections for the same pen units as, the stroke sub-section $906_2$ of the initial stroke section 906 and the stroke sub-section $908_3$ of the initial stroke section 908. In this way, the skeletonized stroke 910 is determined as the sequential combination of the stroke sections 902, 902', 904, 904', 906, 906' and 908.

It is noted that the multiple stroke sections determined after performance of the joining step may not lead to determination of connected or joined stroke sections, and thereby a single skeletonized stroke. For example, some pen units may remain for which stroke sections or sub-sections have not been found, such that multiple and/or isolated skeletonized strokes are found. However, the Applicant has found that this process is sufficient to recover a majority of text characters upon recognition processing, considering that the 'gaps' between the multiple strokes are of the order of one or few pixels.

Alternatively, or additionally, the determined joining stroke sections may be adjusted or corrected and/or more joining stroke sections determined or added by relaxing one or more criteria of the joining step. That is, the tolerance area value and/or the (second) distance threshold may be adjusted to provide this correction. For example, a correction threshold may be defined which is based on the geometry of the pen units, e.g., a correction threshold of about one radius to about three radii of the circular pen units 900. Thereby, an increased (or decreased) number of pen units may be determined to have joining stroke sub-sections. Such a correction step may be performed iteratively.

For the illustrated example, it can be seen from FIG. 9E, the determined skeleton 910 presents stroke information that represents the letter "N" as intended by the user, unlike the skeleton 704 determined in FIG. 7B using conventional skeletonization. As such, in the recognition stage 118 of the input recognition system 114 the segmentation of the skeleton 910 will result in the letter "N" being provided with a sufficient probability score for recognition of this letter, and therefore ultimately recognition of the word "Note" of the imaged handwritten content 302.

It is noted that the depictions of the elements in FIG. 9 are merely for explanation purposes, and are not necessarily shown to the user via the display 102 of the device 100 nor represent actual processing results, for example.

In the example of the present system and method described with respect to FIG. 9, the characters of the rendered text are determined for recognition processing by (iteratively) defining a number of pen units for optimally 'filling' the ink elements based on fitting the maximum number of possible pen units of a selected dimension in the perimeter in accordance with a placement model, such as a gravity model. Other placement models are possible however. A further example of the present system and method using an alternative, or additional, placement model is now described with reference to FIGS. 10 and 11.

Like the earlier examples, the present example of the present system and method determines an optimum combination of the pen unit dimension (first characteristic) and the pen unit positions (second characteristic), in order to determine a number of the pen units that 'best' fits the ink element. That is, with respect to the first characteristic, based on the determined ink element perimeter 702, a pen or stroke width is determined that 'fits' in the character perimeter 702.

However, unlike the earlier examples, in the present example of the present system and method, a pen unit having these dimensions is first positioned at a seed position in the perimeter and from this initial pen unit a path or thinned contour approximately representing the contour of the ink element is determined which serves as at least one path for the pen trajectory.

Like the earlier examples, the seed position may be at one extent or termination of the ink element in the perimeter and at least some of the other pen units may be positioned to contact one or more points of the perimeter of the ink element at one or more respective points of the pen unit with or without a degree of overlap, or to be spaced (by a predetermined and/or (UI) settable space unit) from the perimeter of the ink element. If a termination is not present, an initial location may be selected arbitrarily or at a predetermined position, such as at a position represented by the reference thickness.

Figure 10A:
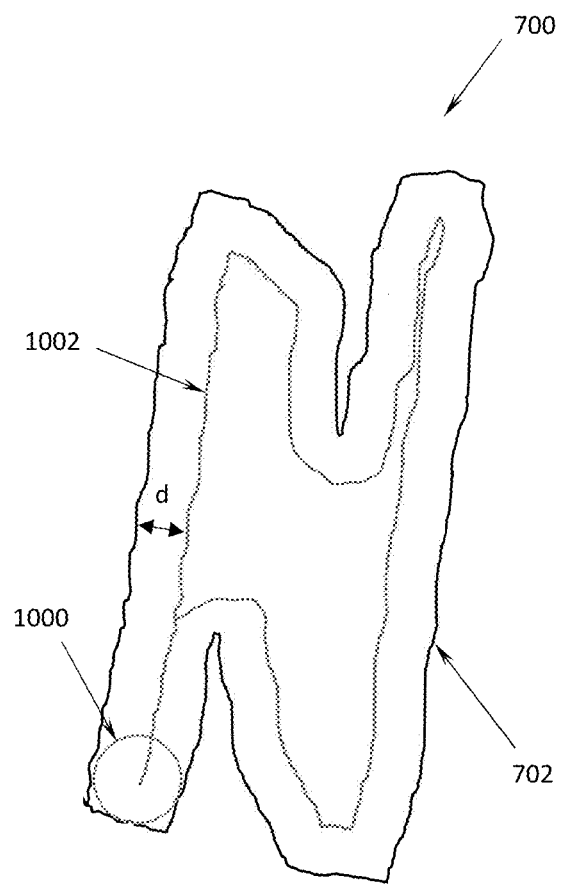
FIG. 10A shows the isolated ink element as shown in FIG. 7B and depicts a thinned contour as determined in accordance with an example of the present system and method.

For example, FIG. 10A shows the ink element 700 of FIG. 7 with a pen unit 1000 positioned at a seed position, being the lower left termination of the ink element 700, for which a thinned contour 1002 has been determined. The thinned contour is determined by re-drawing or following the perimeter of the ink element at a distance from, and within, the perimeter, where that distance is related to a dimension of the seed pen unit, such as width. For example, in the illustrated example the radius of the circular pen unit 1000 is used, such that the thinned contour 1002 is scribed at a distance d approximately according to the radius of the pen unit 1000. Other dimensions of the pen unit can be used depending on the shape or geometry of the pen unit.

Figure 10B:
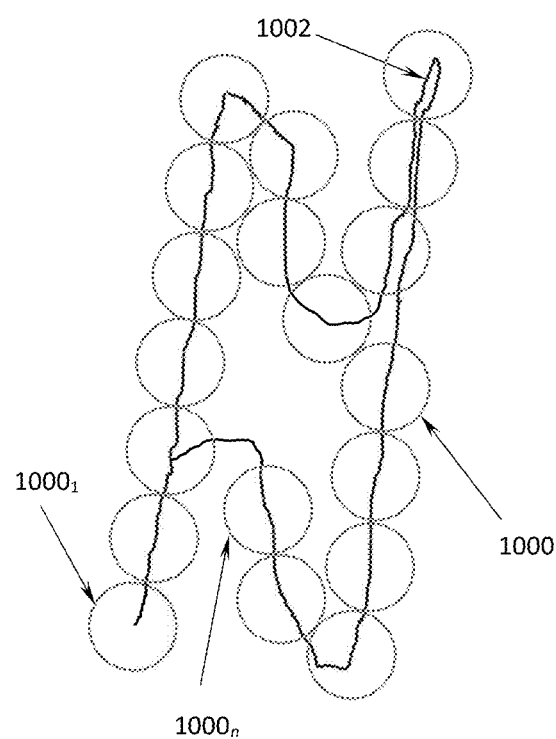
FIG. 10B shows a number of pen units positioned along the thinned contour of FIG. 10B as determined in accordance with an example of the present system and method.

While a thinned contour is determined in the present example of the present system and method, this thinned contour is not directly used for recognition purposes, as thinned contours are conventionally used. Rather, the thinned contour acts as at least one path for distributing more pen units for mapping the pen trajectory, thereby satisfying the second characteristic. This is shown in FIG. 10B in which a number n pen units 1000 (where n is an integer value), are sequentially populated or positioned along the thinned contour 1002 from the seed pen unit $1000_1$ to a final pen unit $1000_n$. In the illustrated example the pen units are positioned so as to be centered on the line of the thinned contour 1002 and abutting or contacting one another along the line, if possible. However, it is possible for the input management system 112, or the input recognition system 114, to arrange the pen units in a different manner, such as to have a pre-determined and/or (UI) settable gap between each pen unit, or to overlap by a pre-determined and/or (UI) settable amount, as similar as to previously described.

It is noted that FIG. 10B illustrates the thinned contour 1002 and the populated pen units 1000 in isolation from the perimeter 702 of the ink element 700. This is because, the ink element contour itself may not be considered by the input management system 112, or the input recognition system 114, after the initial thinning step. As such, it is possible that the pen units may be positioned in a manner which would overlap the ink element perimeter. This is not a problem however, since the pen trajectory represented by the sequence of pen units remains within the ink element perimeter, and can therefore be used to determine skeletonized stroke(s) for the ink element.

Like the earlier examples, FIG. 10B may illustrate the best fit number of pen units 1000 for the example of the ink element 700 with respect to the present example of the present system and method. The present system and method may determine the best fit number of pen units as described above by satisfying the two characteristics in a single step or by performing a series of steps which iterate between the first and second characteristics. Such an iterative process may be an iterative energy minimization method for estimating the handwritten character skeletons which alternates between estimating the stroke width of the pen (first characteristic) and the pen positions (second characteristic) in an expectation maximization setting, as in the previous examples.

Upon determination of the best fit pen unit sequence, the present example proceeds to determining skeletonized stroke(s) therefor using the stroke sectioning process described for the previous example, or the stroke section placement of the first described example, since a sequence of pen units is provided like that example. However, further processing may first be required in order to ensure that the ink element is sufficiently 'filled' with pen units in satisfaction of the first and second characteristics. This is because, the initial thinning process may leave areas of the ink element unpopulated with pen units. For example, as can be seen in FIG. 10B, there are spaces between some of the pen units and an interior space that is not 'filled' with pen units at all. The present example may account for such unpopulated spaces by placing further pen units if there is sufficient space to do so, e.g., such space has dimensions greater than the pen width. This process is now described with respect to FIG. 11.

Figure 11A:
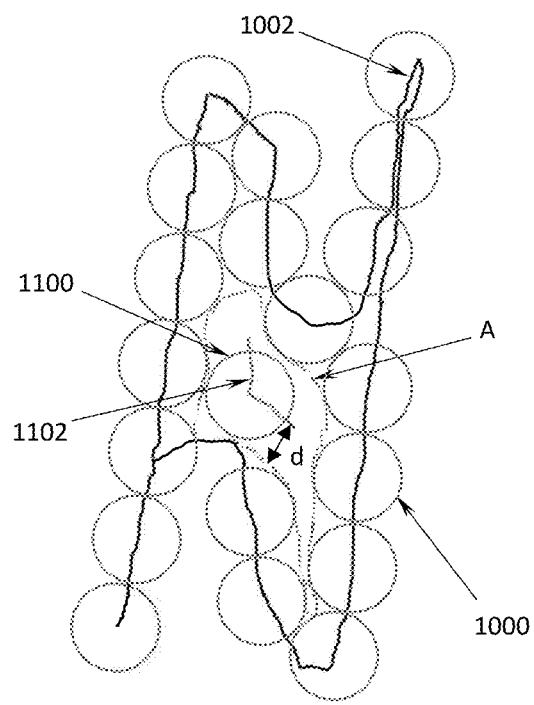
FIG. 11A shows the pen units of FIG. 10B and depicts a further pen unit on a further thinned contour as determined in accordance with an example of the present system and method.

FIG. 11A shows the sequence of pen units 1000 as determined at FIG. 10B with a boundary A of the space interior to the thinned contour 1002 demarcated for illustration purposes relative to the pen units 1000. The input management system 112, or the input recognition system 114, determines the boundary or perimeter of the interior space based on the already-positioned pen units and the thinned contour and uses this boundary to determine if the interior space or area has dimensions greater than the dimensions of the already-positioned pen units. If so, like the initial processing for determining the thinned contour 1002, a pen unit having dimensions of the already-positioned pen units is positioned at a seed position in the interior area and from this initial pen unit a further path or thinned contour approximately representing the contour of the perimeter of the interior space is determined.

For example, in FIG. 11A a further pen unit 1100 is positioned in the boundary A at a seed position, being the lower left corner of the interior space, and a path or thinned contour 1102 is determined. The boundary A of the interior space is determined based on the pen units 1000 surrounding the space and the thinned contour 1002 where there are no pen units, in this way the interior space is not defined to be outside any previously determined thinned contour.

The further thinned contour is determined by re-drawing or following the perimeter of the interior space at a distance from, and within, the boundary, where that distance is related to a dimension of the seed pen unit, such as width. For example, in the illustrated example the radius of the circular pen unit 1100 is used, such that the further thinned contour 1102 is scribed at a distance d approximately according to the radius of the pen unit 1100. Other dimensions of the pen unit can be used depending on the shape or geometry of the pen unit. The further thinned contour acts a path for distributing more further pen units, having the same geometry and dimensions as the initial pen units, so as to be centered on the line of the further thinned contour and abutting or contacting one another along the line, if possible. In the illustrated example, the single further pen unit 1002 is possibly populated on the further thinned contour 1102. As before, it is possible for the input management system 112, or the input recognition system 114, to arrange the further pen units in a different manner, such as to have a predetermined and/or settable (e.g., via the UI) gap between or overlap of each pen unit. Further, the further pen units may be placed in the interior space arbitrarily or using a different placement model, such as the gravity model of the previous example, rather than using the thinning process.

Like the earlier examples, FIG. 11A may illustrate the best fit number of pen units 1000 and 1100 for the example of the ink element 700 with respect to the present example of the present system and method. The present system and method may determine the best fit number of pen units as described above by satisfying the two characteristics in a single step or by performing a series of steps which iterate between the first and second characteristics. Such an iterative process may be an iterative energy minimization method for estimating the handwritten character skeletons which alternates between estimating the stroke width of the pen (first characteristic) and the pen positions (second characteristic) in an expectation maximization setting, as in the previous examples.

With respect to the iterative approach to determining a balance between the first and second characteristics, in the present example (and in the previous example) of the present system and method, the following criteria or constraints may be used for the iteration. Upon placement of the number of pen units in accordance with the placement model being used, e.g., along the thinned contour or in the ink element perimeter in simulation of gravity), the number of pen units is counted by the input management system 112, or the input recognition system 114. This pen unit count is compared to the area (e.g., in pixels) of the ink element to determine a fill ratio value.

The pen unit size is then increased and/or decreased, for example by a factor of the display 102 of the device 100, such as one pixel, or the pen unit dimensions, such as by one radius of the example circular pen units. The steps of seeding the pen units, determining the thinned contour(s) and calculating the fill ratio value, are then repeated. Upon each repetition or iteration the currently calculated fill ratio value is compared to one or more previously calculated fill ratio values to determine if there is a trend in the fill ratio values, and thereby determine if the iterations should cease. For example, if the fill ratio values are getting better, e.g., more of the ink element is being filled with pen units upon each iteration, the iterations are continued. However, if the fill ratio values are getting worse, e.g., less of the ink element is being filled with pen units upon each iteration, the iterations are ceased. Cessation may occur after a predetermined and/or (UI) settable number of iterations for which the trend is negative, e.g., for three to five iterations. In this way, iterative minimization of the number of pen units is provided.

Figure 11B:
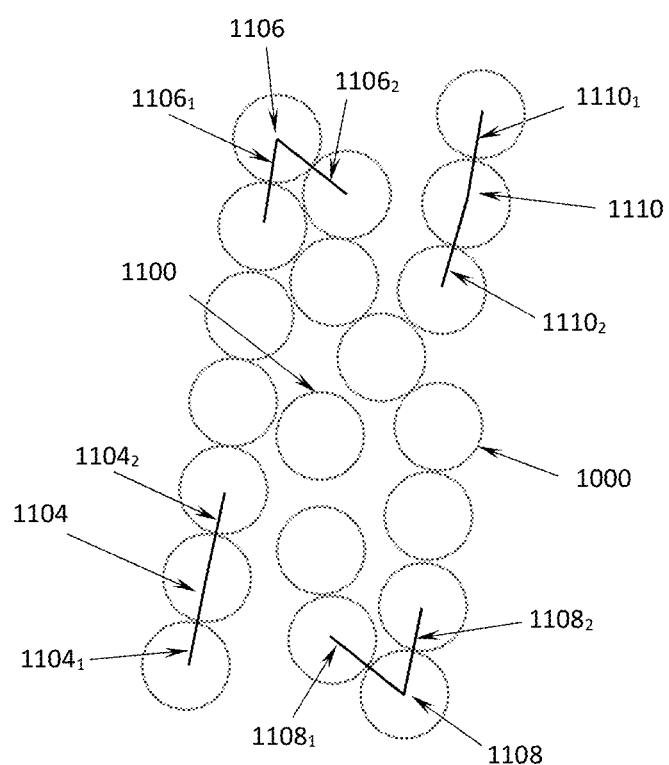
FIG. 11B shows initial stroke sections for some of the pen units of FIG. 11A as determined in accordance with an example of the present system and method.
Figure 11C:
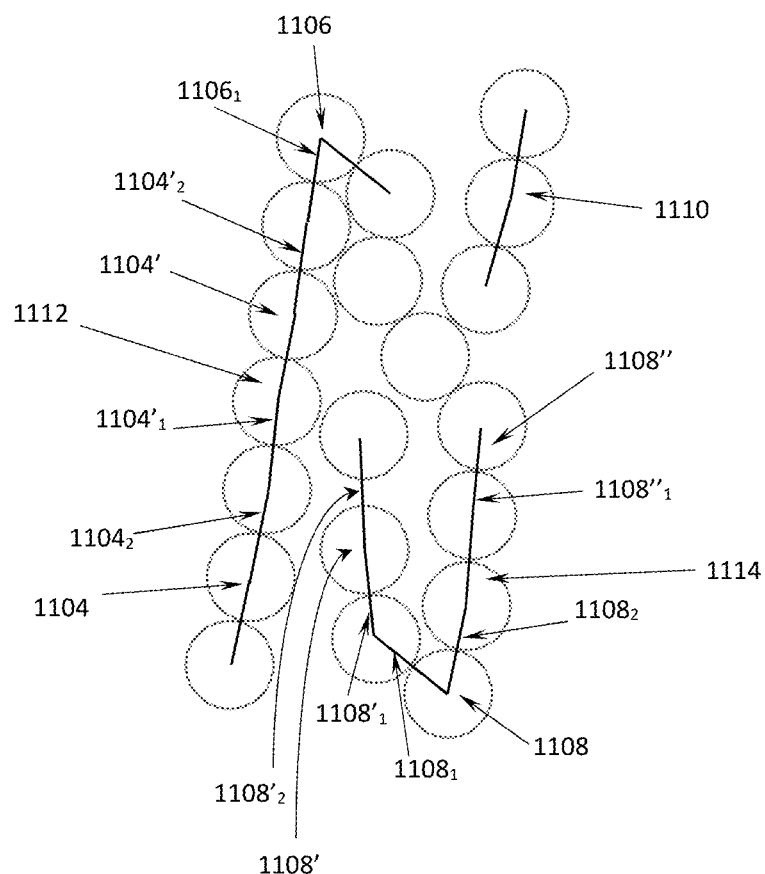
FIG. 11C shows joining stroke sections as determined in accordance with an example of the present system and method for some of the pen units of FIG. 11B.
Figure 11D:
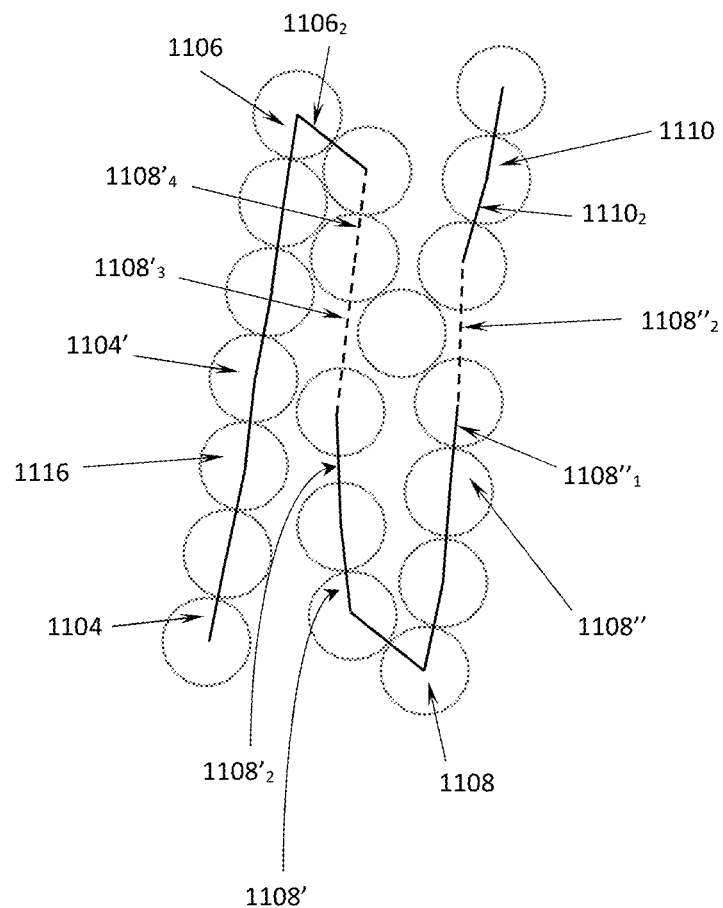
FIG. 11D shows corrected joining strokes as determined in accordance with an example of the present system and method for some of the pen units of FIG. 11C.

Upon determination that the iterations should cease, the pen unit distribution for the last iteration that exhibited a positive fill ratio value is used as the best fit pen unit sequence, e.g., the distribution shown in FIG. 11A may be the best fit pen unit sequence, and the present example proceeds to determining skeletonized stroke(s) therefor. FIGS. 11B-11D show an example of this stroke determination using the stroke sectioning process described for the previous example, that is, using stroke initialization and joining steps, with or without correction.

FIG. 11B shows example results of the stroke initialization step according to the example of FIG. 11A, in which initial (first) stroke sub-sections are determined using the first criteria definitions described in the previous example. In particular, two or less neighboring pen units are used and a (first) separation threshold of about 1.5 radii of the circular pen units 1000 and 1100 is defined from the centers of the pen units 1000 and 1100 to determine the neighboring pen units.

Accordingly, for the example distribution of the pen units 1000 and 1100, the input management system 112 (or the input recognition system 114) determines an initial stroke section 1104 from combining or connecting stroke sub-sections 1104$_1$ and 1104$_2$, an initial stroke section 1106 from combining or connecting stroke sub-sections 1106$_1$ and 1106$_2$, an initial stroke section 1108 from combining or connecting stroke sub-sections 1108$_1$ and 1108$_2$, and an initial stroke section 1110 from combining or connecting stroke sub-sections 1110$_1$ and 1110$_2$, as shown in FIG. 11B.

As can be seen, by using the first criteria of the present example, stroke sections at terminal portions and points of inflection of the ink element 700 are determined. The first criteria of pen units having two or less neighboring pen units is an example, and more or less neighboring pen units may be defined for the first criteria.

Once the initialization step has determined all possible initial stroke sections, the joining step is performed to join at least some of the initial stroke sections, or in other words, to connect at least some of the remaining pen units with adjacent or neighboring pen units.

FIG. 11C shows example results of the stroke joining step according to the example of FIGS. 11A and 11B, in which joining (second) stroke sub-sections are determined using the second criteria definitions described in the previous example. In particular, neighboring pen units that have not been connected are used and (weighted or un-weighted) vectors of stroke sub-sections of one or more previous connected pen units 1000 and 1100 along a (second) distance threshold of about 1.5 radii of the circular pen units 1000 and 1100 defined from the centers of the pen units 1000 and 1100 within a tolerance area of about 50 degrees are used to determine the neighboring pen units.

Accordingly, for the example distribution of the pen units 1000 and 1100, the input management system 112 (or the input recognition system 114) determines a joining stroke section 1104' from combining or connecting stroke sub-sections 1104'$_1$ and 1104'$_2$, a joining stroke section 1108' from combining or connecting stroke sub-sections 1108'$_1$ and 1108'$_2$, and a joining stroke section 1108" from a stroke sub-section 1108"$_1$, as shown in FIG. 11C.

As can be seen, by using the second criteria of the present example, stroke sections between at least some of the terminal portions and points of inflection of the ink element 700 are determined. That is, the joining stroke section 1104' connects to, or has at least sub-sections for the same pen units as, the stroke sub-section 1104$_2$ of the initial stroke section 1104 and the stroke sub-section 1106$_1$ of the initial stroke section 1106, the joining stroke section 1108' connects to, or has at least a sub-section for the same pen unit as, the stroke sub-section 1108$_1$ of the initial stroke section 1108, and the joining stroke section 1108" connects to, or has at least a sub-section for the same pen unit as, the stroke sub-section 1108$_2$ of the initial stroke section 1108.

In this way, multiple skeletonized strokes are determined from the sequential combinations of the stroke sections. That is, a skeletonized stroke 1110 from the stroke section 1110, a skeletonized stroke 1112 from the combination of the stroke sections 1104, 1104' and 1106 and a skeletonized stroke 1114 from the combination of the stroke sections 1108, 1108' and 1108". Accordingly, as described earlier, the multiple stroke sections determined after performance of the joining step in the present example does not lead to a single skeletonized stroke. This is because, some pen units remain for which stroke sections or sub-sections have been not been found. However, the input recognition system 114 will likely form a hypothesis which combines the isolated strokes 1110, 1112 and 1114 to successfully interpret the correct character, e.g., "N".

Alternatively, or additionally, as also described earlier, the determined joining stroke sections may be adjusted or corrected and/or more joining stroke sections determined or added by relaxing one or more criteria of the joining step. That is, the tolerance area value may be adjusted, and/or the (second) distance threshold may be adjusted such as, for example, by applying a correction threshold based on the geometry of the pen units. Such a correction step may be performed iteratively. FIG. 11D shows an example result of the stroke joining correction step applied to the example of FIG. 11C, in which a correction threshold of about two radii of the circular pen units 1000 and 1100 has been applied to the (second) distance threshold within the tolerance area of about 50 degrees.

Accordingly, for the example distribution of the pen units 1000 and 1100, the input management system 112 (or the input recognition system 114) determines a corrected version of the joining stroke section 1108' from combining or connecting the previously determined stroke sub-sections 1108'$_1$ and 1108'$_2$ with additional stroke sub-sections 1108'$_3$ and 1108'$_4$ (shown in dashed lines), and a corrected version of the joining stroke section 1108" from combining or connecting the previously determined stroke sub-section 1108"$_1$ with an additional stroke sub-section 1108"$_2$ (shown in dashed lines), as shown in FIG. 11D.

As can be seen, by using the corrected second criteria of the present example, stroke sections between all of the terminal portions and points of inflection of the ink element 700 are determined. That is, the joining stroke section 1104' connects to, or has at least sub-sections for the same pen units as, the stroke sub-section 1104$_2$ of the initial stroke section 1104 and the stroke sub-section 1106$_1$ of the initial stroke section 1106, the corrected joining stroke section 1108' connects to, or has at least sub-sections for the same pen units as, the stroke sub-section 1106$_2$ of the initial stroke section 1106 and the stroke sub-section 1108$_1$ of the initial stroke section 1108, and the corrected joining stroke section 1108" connects to, or has at least sub-sections for the same pen units as, the stroke sub-section 1108$_2$ of the initial stroke section 1108 and the stroke sub-section 1110$_2$ of the initial stroke section 1110.

In this way, a single skeletonized stroke is determined from the sequential combinations of the stroke sections. That is, a skeletonized stroke 1116 is determined from the sequential combination of the stroke sections 1104, 1104', 1106, 1108', 1108, 1108" and 1110.

For the illustrated example, it can be seen from FIG. 11D, the determined skeleton 1116 presents stroke information that represents the letter "N" as intended by the user, unlike the skeleton 704 determined in FIG. 7B using conventional skeletonization. As such, in the recognition stage 118 of the input recognition system 114 the segmentation of the skeleton 1116 will result in the letter "N" being provided with a sufficient probability score for recognition of this letter, and therefore ultimately recognition of the word "Note" of the imaged handwritten content 302.

It is noted that the depictions of the elements in FIGS. 10 and 11 are merely for explanation purposes, and are not necessarily shown to the user via the display 102 of the device 100 nor represent actual processing results, for example.

In the examples of the present system and method described so far, example processing of an ink element which potentially relates to a text character handwritten with a single stroke has been explained. Such example processing is also applicable to ink elements which potentially relate to text characters that have been handwritten with multiple strokes, such as the text characters "t", "T" and "k" of the handwritten content 302. An example of the present system and method with respect to a multiple stroke ink element is now described with respect to FIG. 12.

Figure 12A:
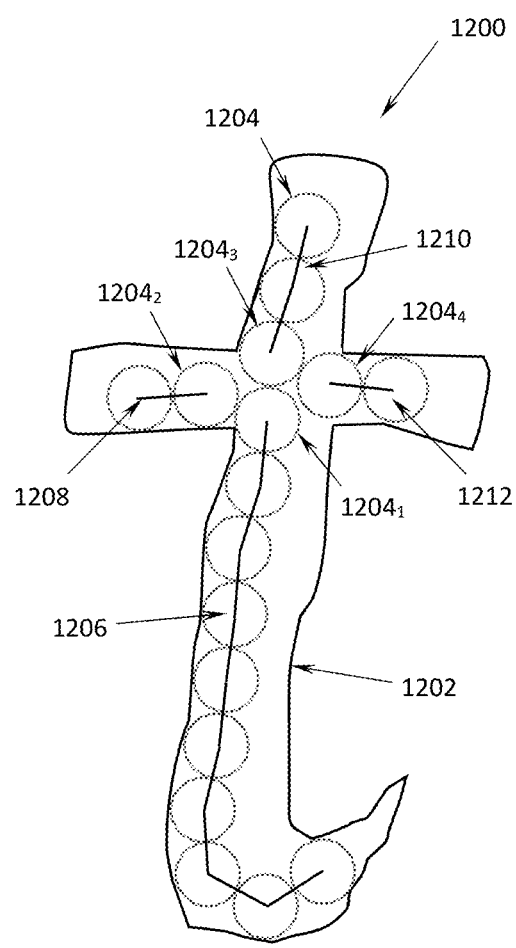
FIG. 12A shows an ink element of the digital ink of FIG. 4 in isolation depicting its perimeter and a number of pen units and initial stroke sections for some of the pen units as determined in accordance with an example of the present system and method.

FIG. 12A shows an isolated ink element 1200 of the image or digital ink 306 depicting a perimeter or contour 1202 of the ink element 1200 with the internal 'ink' of the ink element 1200 omitted, for illustration purposes only. The ink element 1200 represents a character of the handwritten content 302 in isolation from the other characters. The ink element 1200 is a text character, being the lower case letter "t" that is the third letter of the word "Note" of the handwritten content 302. As can be seen, the 'ink' of the ink element 1200 is reasonably 'thick', but easily discernible as the letter "t" by the reader. The input management system 112, or the input recognition system 114, is configured to determine the perimeter 1202 of the ink element 1200 by determining the boundary pixels in the image or the rendered digital ink using, for example, well-known image processing techniques.

FIG. 12A further shows a number of pen widths 1204 that have been determined and positioned in the perimeter 1202 of the ink element 1200 by the input management system 112, or the input recognition system 114, in accordance with the earlier described example thinned contour placement. Further, FIG. 12A shows a number of initial stroke sections 1206, 1208, 1210 and 1212 that have been determined for the placed pen units 1204 by the input management system 112, or the input recognition system 114, in accordance with the earlier described example (first) initial stroke section step.

As can be seen, at this point of the example processing, multiple stroke sections have been found which are isolated from one another, since stroke sections which traverse pen units 1204$_1$, 1204$_2$, 1204$_3$ and 1204$_4$ have not been determined. This is like the earlier described processing of the single stroke ink element 700 at the point of processing depicted in FIG. 11B. However, with respect to the multiple stroke ink element 1200, if the earlier described example processing is continued at this point to join or connect the pen units 1204$_1$, 1204$_2$, 1204$_3$ and 1204$_4$ with the defined criteria, e.g., by proceeding to the (second) joining stroke section step with the defined tolerance area and (second) distance threshold values, it is possible that ambiguous joining stroke sections will be determined.

This is because, if a tolerance area value of about 50 degrees is used, at least two joining stroke sections for the pen unit 1204$_1$ may possibly be found linking to the stroke sections 1208 and 1212 and two joining stroke sections for the pen unit 1204$_4$ may possibly be found also linking to the stroke sections 1208 and 1212. As a result, a single skeletonized stroke may be determined, rather than two strokes as expected. While such a handwritten stroke structure is not beyond the realms of possibility, it is unlikely for a text character. Such ambiguity may be handled by the present system and method by not performing the stroke joining step, by performing the stroke joining step only under certain conditions, or by adapting the previously described criteria for the stroke joining step.

In an example in which the stroke joining step is performed only under certain conditions, the input recognition system 112, or the input recognition system 114, may be configured to route the multiple stroke sections as determined by the initial stroke sectioning step to the input recognition system 114, or the recognizer 118, for recognition when it is determined that all pen units have a stroke sub-section determined therefor, or assigned thereto, as in the example of FIG. 12A, and to continue to the stroke joining step when un-assigned pen units are present. For example, in the recognition stage 118 of the input recognition system 114 the segmentation applied to the multiple stroke sections 1206, 1208, 1210 and 1212 of the example of FIG. 12A is likely to result in the letter "t" being provided with a sufficient probability score for recognition of this letter, especially considering that the 'gaps' between the multiple strokes are off the order of one or few pixels. Alternatively, or additionally, this may be done when there is a predetermined or settable (e.g., via the UI) number or range of pen units, e.g., one to three, or percentage of pen units, e.g., about one to about five percent, that are un-assigned.

In an example in which the criteria for the stroke joining step is adapted or provided in a different manner, the input management system 112, or the input recognition system 114, may be configured to perform the stroke joining step utilizing the third criteria of elongating the determined vector(s) by the second distance threshold, and relaxing or omitting the fourth criteria of applying the tolerance area to the elongated vector(s), or iteratively applying an increasing or decreasing tolerance area value to the elongated vector(s), or iteratively applying increasing or decreasing distance threshold and tolerance area values. Such application or iteration may be constrained by determining whether each assigned pen unit has only two or less stroke sub-sections assigned thereto. In this way, excessive 'branching' of the skeletonized stroke(s) is avoided.

Figure 12B:
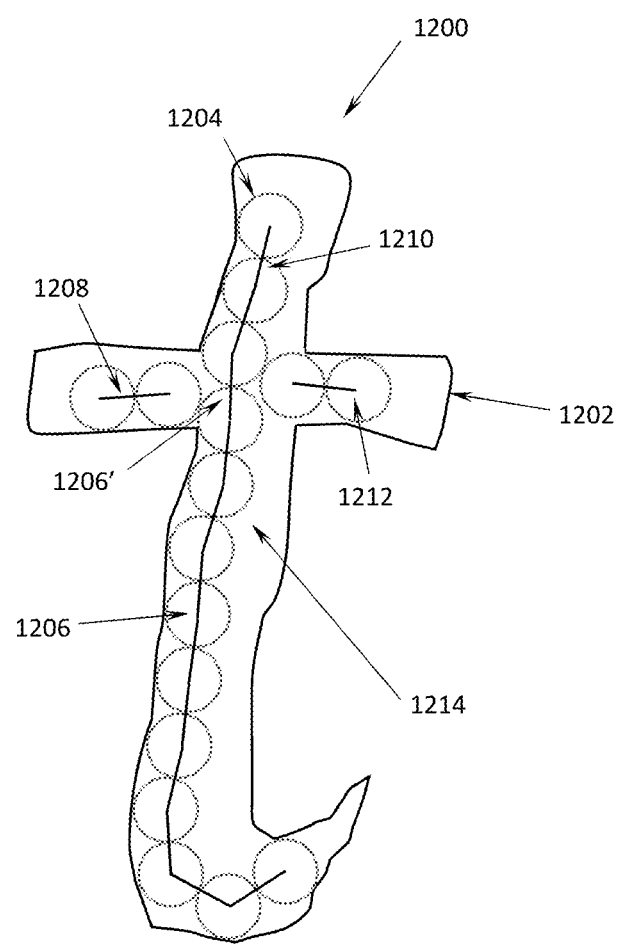
FIG. 12B shows joining stroke sections as determined in accordance with an example of the present system and method for some of the pen units of FIG. 12A.

FIG. 12B shows the example result of the input management system 112, or the input recognition system 114, performing the joining stroke section step after the initial stroke section step of FIG. 12A, in which the third criteria has been applied with a (second) distance threshold of about 1.5 radii of the pen units 1204 and a reduced tolerance area value of about 10 degrees. Accordingly, as shown, a joining stroke (sub-)section 1206' is determined which joins or connects to (the stroke sub-sections of) the initial stroke sections 1206 and 1210. On the other hand, due to the reduced tolerance area value, branched stroke sub-sections are not determined for the pen units 1204$_2$ and 1204$_4$. The processing may proceed by iteratively increasing the tolerance area value until such branched stroke sub-sections are determined, at which point the iterations cease and the stroke (sub-)sections determined with the last tolerance area value that did not produce branched (sub-)sections are used for further processing.

At this point, the input management system 112, or the input recognition system 114, may be configured to determine one or more skeletonized strokes from those multiple stroke sections that can be combined and route all strokes for the ink element for recognition. That is, a skeletonized stroke 1214 may be determined from the combination of the stroke sections 1206, 1206' and 1210, which is processed together with the strokes 1208 and 1212. Alternatively, or additionally, once the iterative joining process is complete, the earlier described correction step may also be performed with further iteration of the third criteria only, that is, an increase of the (second) distance threshold.

Figure 12C:
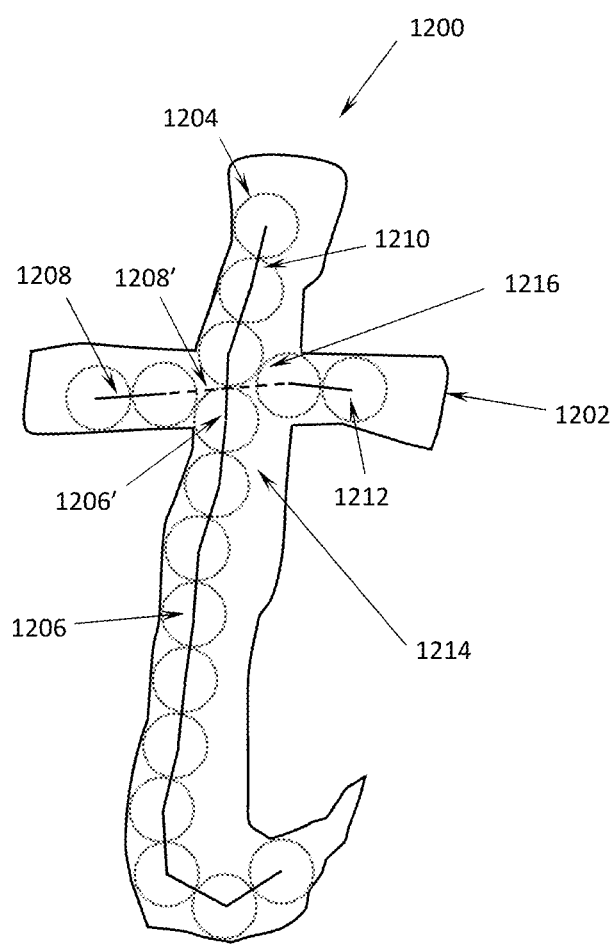
FIG. 12C shows corrected joining strokes as determined in accordance with an example of the present system and method for some of the pen units of FIG. 12B.

FIG. 12C shows the example result of the input management system 112, or the input recognition system 114, performing the correction step after the iterative joining stroke section step of FIG. 12B, in which the third criteria has been applied with an (iteratively) increased distance threshold. Accordingly, as shown, a corrected joining stroke (sub-)section 1208' (shown in dashed lines) is determined which joins or connects to (the stroke sub-sections of) the initial stroke sections 1208 and 1212. In this way, multiple skeletonized stroked are determined from sequential combinations of the stroke sections. That is, the skeletonized stroke 1214 is determined from the combination of the 1206, 1206' and 1210, and a skeletonized stroke 1216 is determined from the combination of the 1208, 1208' and 1212.

For the illustrated example, it can be seen from FIG. 12C, the determined skeletons 1214 and 1216 present multiple stroke information that represents the letter "t" as intended by the user. As such, in the recognition stage 118 of the input recognition system 114 the segmentation of the skeletons 1214 and 1216 will result in the letter "t" being provided with a sufficient probability score for recognition of this letter, and therefore ultimately recognition of the word "Note" of the imaged handwritten content 302.

It is noted that the depictions of the elements in FIG. 12 are merely for explanation purposes, and are not necessarily shown to the user via the display 102 of the device 100 nor represent actual processing results, for example.

The connection of the centers of the pen units as shown in FIGS. 7 to 12 are examples, and one or more other common points or geometrical components of the pen units may be used for connecting the stroke portions, in accordance with the defined shape of the pen units. Further, the formation of the skeleton from plural connected portions is an example, and other formations may be used, such as the formation of a continuous line through predetermined and/or (UI) settable common points or geometrical components of each pen unit, or the calculation of a geometrical line or curve, such as a curve calculated through differential calculus or the like.

Alternatively, or additionally, the present system and method may determine the skeleton for at least some of the iterations of the pen units, and analyze these skeletons in order to determine the best fit or optimum skeleton of the ink element. The fit may be determined through measurement or other determination of attributes of the skeletons, such as average distance from the ink element boundaries, the number of changes of direction in the stroke, etc. These attributes may be compared with pre-determined and/or (UI) settable threshold values or relatively compared against the attributes determined for the next iteration or a number of subsequent iterations, in order to determine the skeleton having the best fit. In this way, the correct pen trajectory is converged upon with each iteration.

The present system and method improves on the conventional methods of off-line recognition of handwritten and printed/typed objects or content, as the stroke of each ink element is recovered or synthesized as a pen trajectory of the handwriting, printing or rendering that formed the ink element.

This pen trajectory/stroke is determined for input from (off-line) imaged handwriting or printing/typing, for input from digital or typeset ink representations of off-line images, and for direct input (on-line) of handwriting or typing. Further, not only isolated imaged handwritten characters or 'on-screen' handwritten characters are recognized in the present system and method but characters formed from overlapping or touching strokes are recognized. Further, artefacts like skeletonization-induced unwanted trajectories in the form of tails, neckings, etc., are reduced and lesser deviation of the pen trajectory from that of the original handwriting results.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for recognition of objects from ink elements on a computing device, the computing device comprising a processor, a memory and at least one non-transitory computer readable medium for recognizing content under control of the processor, the at least one non-transitory computer readable medium configured to:
   determine a perimeter of an ink element stored in a memory of the computing device;
   determine a plurality of pen units for the ink element based on the determined ink element perimeter, wherein the plurality of pen units is determined based on a first characteristic of the pen units related to at least one dimension value of the pen units and a second characteristic of the pen units related to positions of the pen units relative to the ink element, wherein the plurality of pen units is determined to best fit the ink element based on iteratively determining values of the first and second characteristics of the pen units;
   determine at least one stroke representing a path through two or more of the pen units; and
   cause recognition of one or more objects represented by the ink element using the determined at least one stroke.

2. A system according to claim 1, wherein the at least one non-transitory computer readable medium is configured to determine at least one contour of the ink element which represents the determined ink element perimeter in accordance with the at least one dimension value of the pen units, wherein the plurality of pen units are positioned relative to the at least one contour.

3. A system according to claim 1, wherein the at least one non-transitory computer readable medium is configured to determine the at least one stroke by defining one or more stroke sections based on at least one dimensional feature of the pen units.

4. A system according to claim 3, wherein the at least one non-transitory computer readable medium is configured to define the one or more stroke sections by combining one or more first stroke sections determined based on a first threshold of separation of the pen units with one or more second stroke sections determined based on geometrical relationships of at least the one or more first stroke sections and a second threshold of separation of the pen units.

5. A system according to claim 4, wherein the at least one non-transitory computer readable medium is configured to determine the geometrical relationships based on vectors related to at least the one or more first stroke sections.

6. A system according to claim 1, wherein the ink elements are stored in the memory as image data representing the ink elements as captured by an image capture device.

7. A method for recognition of objects from ink elements on a computing device, the computing device comprising a processor, a memory and at least one non-transitory computer readable medium for recognizing content under control of the processor, the method comprising:
   determining a perimeter of an ink element stored in a memory of the computing device;
   determining a plurality of pen units for the ink element based on the determined ink element perimeter, wherein the plurality of pen units are determined based on a first characteristic of the pen units related to at least one dimension value of the pen units and a second characteristic of the pen units related to positions of the pen units relative to the ink element, wherein the plurality of pen units are determined to best fit the ink element based on iteratively determining values of the first and second characteristics of the pen units;
   determining at least one stroke representing a path through two or more of the pen units; and
   causing recognition of one or more objects represented by the ink element using the determined at least one stroke.

8. A method according to claim 7, further comprising determining at least one contour of the ink element which represents the determined ink element perimeter in accordance with the at least one dimension value of the pen units, wherein the plurality of pen units are positioned relative to the at least one contour.

9. A method according to claim 7, wherein the at least one stroke is determined by defining one or more stroke sections based on at least one dimensional feature of the pen units.

10. A method according to claim 9, wherein the one or more stroke sections are defined by combining one or more first stroke sections determined based on a first threshold of separation of the pen units with one or more second stroke sections determined based on geometrical relationships of at least the one or more first stroke sections and a second threshold of separation of the pen units.

11. A method according to claim 10, further comprising determining the geometrical relationships based on vectors related to at least the one or more first stroke sections.

12. A method according to claim 7, wherein the ink elements are stored in the memory as image data representing the ink elements as captured by an image capture device.

13. A non-transitory computer readable medium having a computer readable program code embodied therein, said computer readable program code adapted to be executed to implement a method for recognition of objects from ink elements on a computing device, the computing device comprising a processor, a memory and at least one non-transitory computer readable medium for recognizing content under control of the processor, the method comprising:
   determining a perimeter of an ink element stored in a memory of the computing device;
   determining a plurality of pen units for the ink element based on the determined ink element perimeter, wherein the plurality of pen units are determined based on a first characteristic of the pen units related to at least one dimension value of the pen units and a second characteristic of the pen units related to positions of the pen units relative to the ink element, wherein the plurality of pen units are determined to best fit the ink element based on iteratively determining values of the first and second characteristics of the pen units;

determining at least one stroke representing a path through two or more of the pen units; and causing recognition of one or more objects represented by the ink element using the determined at least one stroke.

14. A non-transitory computer readable medium according to claim 13, wherein the method further comprising determining at least one contour of the ink element which represents the determined ink element perimeter in accordance with the at least one dimension value of the pen units, wherein the plurality of pen units are positioned relative to the at least one contour.

15. A non-transitory computer readable medium according to claim 13, wherein the at least one stroke is determined by defining one or more stroke sections based on at least one dimensional feature of the pen units.

16. A non-transitory computer readable medium according to claim 15, wherein the one or more stroke sections are defined by combining one or more first stroke sections determined based on a first threshold of separation of the pen units with one or more second stroke sections determined based on geometrical relationships of at least the one or more first stroke sections and a second threshold of separation of the pen units .

17. A non-transitory computer readable medium according to claim 16, the method further comprising determining the geometrical relationships based on vectors related to at least the one or more first stroke sections.

18. A non-transitory computer readable medium according to claim 13, wherein the ink elements are stored in the memory as image data representing the ink elements as captured by an image capture device.

19. A system for recognition of objects from ink elements on a computing device, the computing device comprising a processor, a memory and at least one non-transitory computer readable medium for recognizing content under control of the processor, the at least one non-transitory computer readable medium configured to:

determine a perimeter of an ink element stored in a memory of the computing device;

determine a plurality of pen units for the ink element based on the determined ink element perimeter;

determine at least one stroke representing a path through two or more of the pen units, wherein the at least one stroke is determined by defining one or more stroke sections based on at least one dimensional feature of the pen units, wherein the one or more stroke sections is defined by combining one or more first stroke sections determined based on a first threshold of separation of the pen units with one or more second stroke sections determined based on geometrical relationships of at least the one or more first stroke sections and a second threshold of separation of the pen units; and cause recognition of one or more objects represented by the ink element using the determined at least one stroke.

20. A system according to claim 19, wherein the at least one non-transitory computer readable medium is configured to determine the geometrical relationships based on vectors related to at least the one or more first stroke sections.

21. A method for recognition of objects from ink elements on a computing device, the computing device comprising a processor, a memory and at least one non-transitory computer readable medium for recognizing content under control of the processor, the method comprising:

determining a perimeter of an ink element stored in a memory of the computing device;

determining a plurality of pen units for the ink element based on the determined ink element perimeter;

determining at least one stroke representing a path through two or more of the pen units, wherein the at least one stroke is determined by defining one or more stroke sections based on at least one dimensional feature of the pen units, wherein the one or more stroke sections are defined by combining one or more first stroke sections determined based on a first threshold of separation of the pen units with one or more second stroke sections determined based on geometrical relationships of at least the one or more first stroke sections and a second threshold of separation of the pen units; and causing recognition of one or more objects represented by the ink element using the determined at least one stroke.

22. A method according to claim 21, further comprising determining the geometrical relationships based on vectors related to at least the one or more first stroke sections.

23. A non-transitory computer readable medium having a computer readable program code embodied therein, said computer readable program code adapted to be executed to implement a method for recognition of objects from ink elements on a computing device, the computing device comprising a processor, a memory and at least one non-transitory computer readable medium for recognizing content under control of the processor, the method comprising:

determining a perimeter of an ink element stored in a memory of the computing device;

determining a plurality of pen units for the ink element based on the determined ink element perimeter;

determining at least one stroke representing a path through two or more of the pen units, wherein the at least one stroke is determined by defining one or more stroke sections based on at least one dimensional feature of the pen units, wherein the one or more stroke sections are defined by combining one or more first stroke sections determined based on a first threshold of separation of the pen units with one or more second stroke sections determined based on geometrical relationships of at least the one or more first stroke sections and a second threshold of separation of the pen units: and causing recognition of one or more objects represented by the ink element using the determined at least one stroke.

24. A non-transitory computer readable medium according to claim 23, the method further comprising determining the geometrical relationships based on vectors related to at least the one or more first stroke sections.

* * * * *